(12) United States Patent
Ridgeway

(10) Patent No.: US 8,645,235 B2
(45) Date of Patent: Feb. 4, 2014

(54) BIASING OF SEARCH RESULT CLUSTERING TO ENSURE MORE EFFECTIVE POINT OF INTEREST (POI) TARGETING

(75) Inventor: James Ridgeway, Falls Church, VA (US)

(73) Assignee: AOL Inc., Dulles, VA (US)

( * ) Notice: Subject to any disclaimer, the term of this patent is extended or adjusted under 35 U.S.C. 154(b) by 248 days.

(21) Appl. No.: 12/833,533

(22) Filed: Jul. 9, 2010

(65) Prior Publication Data

US 2011/0166957 A1    Jul. 7, 2011

Related U.S. Application Data

(62) Division of application No. 11/465,009, filed on Aug. 16, 2006, now Pat. No. 7,761,350.

(60) Provisional application No. 60/794,856, filed on Apr. 26, 2006.

(51) Int. Cl.
    *G07B 17/00*      (2006.01)
    *G01C 21/30*      (2006.01)
    *G01C 21/00*      (2006.01)

(52) U.S. Cl.
    USPC .............................. 705/30; 701/209; 701/203

(58) Field of Classification Search
    USPC ..................... 705/30; 701/209, 203
    See application file for complete search history.

(56) References Cited

U.S. PATENT DOCUMENTS

| | | | | |
|---|---|---|---|---|
| 5,428,726 A * | 6/1995 | Piegl et al. | ..................... | 345/441 |
| 5,648,768 A * | 7/1997 | Bouve | ..................... | 340/988 |
| 5,948,040 A * | 9/1999 | DeLorme et al. | ..................... | 701/426 |
| 6,026,384 A * | 2/2000 | Poppen | ..................... | 705/400 |
| 6,134,556 A * | 10/2000 | Shin | ..................... | 1/1 |
| 6,266,614 B1 * | 7/2001 | Alumbaugh | ..................... | 701/468 |
| 6,278,938 B1 * | 8/2001 | Alumbaugh | ..................... | 701/438 |
| 6,278,940 B1 * | 8/2001 | Endo | ..................... | 701/533 |
| 6,336,073 B1 * | 1/2002 | Ihara et al. | ..................... | 701/533 |
| 6,401,029 B1 * | 6/2002 | Kubota et al. | ..................... | 701/408 |
| 6,408,307 B1 * | 6/2002 | Semple et al. | ..................... | 707/724 |
| 6,434,482 B1 * | 8/2002 | Oshida et al. | ..................... | 701/426 |

(Continued)

OTHER PUBLICATIONS

Tae-Kyung Moon; Joon-Hyung Cho; Seong-Hee Jeong; Jun-Nam Oh, "Hot-Drive—Preliminary retrieved POI cognitive driver navigation system," Consumer Electronics, 2006. ISCE '06. 2006 IEEE Tenth International Symposium on , vol., No., pp. 1,6, 0-00.*

*Primary Examiner* — Matthew Gart
*Assistant Examiner* — Ashford S Hayles
(74) *Attorney, Agent, or Firm* — Finnegan, Henderson, Farabow, Garrett & Dunner, LLP

(57) ABSTRACT

Directory service results responsive to a request for a desired good or service provider may be provided based on one or more user-selected locations. The user may seek a desired good or service provider that is proximate to a location from which the user may begin traveling to the point of interest, referred to as a source location, and satisfies a beneficial objective held by the user. The beneficial objective may relate to, for example, a directional travel preference, avoiding rush hour traffic or proximity to a specific location or another type of good or service provider that differs from the user's desired good or service provider that is the subject of the user's request. A sequence of geometrical representations, such as, for example, Delauney Triangles, may be generated to provide directory service results that satisfy the user's request.

20 Claims, 15 Drawing Sheets

(56) References Cited

U.S. PATENT DOCUMENTS

| | | | |
|---|---|---|---|
| 6,504,541 B1 * | 1/2003 | Liu et al. | 345/619 |
| 6,505,120 B2 * | 1/2003 | Yamashita et al. | 701/428 |
| 6,529,143 B2 * | 3/2003 | Mikkola et al. | 340/995.1 |
| 6,571,169 B2 * | 5/2003 | Miyaki | 701/400 |
| 6,587,782 B1 * | 7/2003 | Nocek et al. | 701/438 |
| 6,587,787 B1 * | 7/2003 | Yokota | 701/532 |
| 6,839,628 B1 * | 1/2005 | Tu | 701/426 |
| 6,853,914 B2 * | 2/2005 | Hahlweg et al. | 701/409 |
| 6,917,878 B2 * | 7/2005 | Pechatnikov et al. | 701/411 |
| 6,931,615 B1 * | 8/2005 | Teig et al. | 716/129 |
| 6,941,220 B2 * | 9/2005 | Le et al. | 701/419 |
| 6,944,536 B2 * | 9/2005 | Singleton | 701/410 |
| 6,950,552 B2 * | 9/2005 | Nair et al. | 382/195 |
| 6,975,938 B2 * | 12/2005 | Odagawa et al. | 701/465 |
| 7,024,402 B2 * | 4/2006 | Morimoto et al. | 707/776 |
| 7,069,531 B1 * | 6/2006 | Teig et al. | 716/126 |
| 7,076,741 B2 | 7/2006 | Miyaki | |
| 7,093,221 B2 * | 8/2006 | Teig et al. | 716/129 |
| 7,155,339 B2 * | 12/2006 | Tu | 701/426 |
| 7,194,357 B2 * | 3/2007 | Smith | 701/533 |
| 7,196,662 B2 * | 3/2007 | Misikangas et al. | 342/451 |
| 7,233,862 B2 * | 6/2007 | Endo et al. | 701/428 |
| 7,254,479 B2 * | 8/2007 | Cheon | 701/454 |
| 7,271,742 B2 * | 9/2007 | Sheha et al. | 340/995.24 |
| 7,272,489 B2 * | 9/2007 | Tu | 701/438 |
| 7,373,244 B2 * | 5/2008 | Kreft | 701/532 |
| 7,388,519 B1 * | 6/2008 | Kreft | 340/995.24 |
| 2002/0016671 A1 | 2/2002 | Shinada et al. | |
| 2002/0038180 A1 | 3/2002 | Bellesfield et al. | |
| 2002/0105924 A1 * | 8/2002 | Yang et al. | 370/329 |
| 2002/0130906 A1 * | 9/2002 | Miyaki | 345/837 |
| 2003/0036848 A1 | 2/2003 | Sheha et al. | |
| 2003/0069690 A1 | 4/2003 | Correia et al. | |
| 2003/0096622 A1 | 5/2003 | Moilanen | |
| 2003/0125872 A1 | 7/2003 | Kauvo et al. | |
| 2003/0229441 A1 | 12/2003 | Pechatnikov et al. | |
| 2004/0019581 A1 * | 1/2004 | Davis et al. | 707/1 |
| 2004/0049335 A1 | 3/2004 | Schmidt et al. | |
| 2004/0148320 A1 | 7/2004 | Zabarski et al. | |
| 2004/0260465 A1 * | 12/2004 | Tu | 701/209 |
| 2005/0075119 A1 | 4/2005 | Sheha et al. | |
| 2005/0177303 A1 * | 8/2005 | Han | 701/209 |
| 2005/0187707 A1 * | 8/2005 | Yokota et al. | 701/209 |
| 2005/0234639 A1 | 10/2005 | Endo et al. | |
| 2006/0229778 A1 | 10/2006 | Obradovich et al. | |
| 2006/0287810 A1 * | 12/2006 | Sadri et al. | 701/200 |
| 2007/0014488 A1 * | 1/2007 | Chen et al. | 382/294 |
| 2007/0129063 A1 | 6/2007 | Recio et al. | |
| 2007/0168118 A1 | 7/2007 | Lappe et al. | |

* cited by examiner

| 300 | Potential Beneficial Objective Locations 310 | Potential Points of Interest 320 | Length of Edges Between Source Location (Home) & Potential Beneficial Objective Location 330 | Length of Edge Between Source Location (Home) & Potential Point of Interest 340 | Radius of Circumcircle 350 |
|---|---|---|---|---|---|
| Row A | Town A | Movies A | L(BOLa) | L(POIa) | R(a) |
| Row B | Town B | Movies B | L(BOLb) | L(POIb) | R(b) |

POINT OF INTEREST SEARCH

← 1050

You have selected a beneficial objective type that requires more information!

Enter The Location Related To Your Beneficial Objective ← 1060

| Street Address (1061) | City or Town (1062) | State (1063) | Zip Code (1064) |

SEARCH — 1070

FIG. 10B

BIASING OF SEARCH RESULT CLUSTERING TO ENSURE MORE EFFECTIVE POINT OF INTEREST (POI) TARGETING

CROSS REFERENCE TO RELATED APPLICATIONS

This application is a divisional of U.S. application Ser. No. 11/465,009, filed Aug. 16, 2006 now U.S. Pat. No. 7,761,350 (now allowed). U.S. application Ser. No. 11/465,009 claims the benefit of U.S. Provisional Application No. 60/794,856, filed Apr. 26, 2006 and titled "Biasing Of Search Result Clustering To ensure More Effective Point Of Interest (POI) Targeting." All of the above applications are incorporated herein by reference in their entireties.

TECHNICAL FIELD

This document relates to presenting results to a user.

BACKGROUND

Directory services may provide a name and location for a good or service provider in response to a user request. The good or service provider may be identified by the directory service based on a location provided by the user as part of the request.

SUMMARY

In a general aspect, a point of interest is provided. A request for a point of interest is received from a user. The request includes a desired good or service provider and a source location. A beneficial objective related to the request is identified. At least one beneficial objective location associated with the identified beneficial objective is determined. At least one potential point of interest that satisfies the request is determined. The point of interest that best satisfies the request is provided.

With respect to at least the first general aspect, implementations may include one or more of the following features. For example, a sequence of geometrical representations may be determined based on the source location, the at least one beneficial objective location and the at least one potential point of interest. The point of interest that best satisfies the request based on a relationship of the geometrical representations within the sequence may be provided. An indication of a source location for a user may be received. The indication of the source location may include a detailed source location for the user or an identifier that points to a detailed source location for the user. The detailed source location for the user may be translated into a general source location. The sequence of geometrical representations may be determined based on the detailed source location, the at least one beneficial objective location and the at least one potential point of interest.

Identifying a beneficial objective related to the request may include receiving a beneficial objective from a user or inferring a beneficial objective for a user.

Determining at least one beneficial objective location associated with the identified beneficial objective may include receiving a beneficial objective location from the user.

Determining at least one potential point of interest that satisfies the request may include determining at least one potential point of interest that is a match for the requested good or service provider, is proximate to the source location and satisfies the beneficial objective. A potential point of interest may satisfy the beneficial objective if the potential point of interest is proximate to a beneficial objective location associated with the beneficial objective. Alternatively, a potential point of interest may satisfy the beneficial objective if the potential point of interest is not proximate to a beneficial objective location associated with the beneficial objective.

The sequence of geometrical representations may include a sequence of Delauney Triangles, such that a circumcircle about one Delauney Triangle does not include any edges of any other Delauney Triangles. Determining a sequence of geometrical representations based on the source location, the at least one beneficial objective location and the at least one potential point of interest may include determining a sequence of Delauney Triangles where the vertices of the Delauney Triangles are defined as the source location, the at least one beneficial objective location and the at least one potential point of interest.

The relationship of the geometrical representations within the sequence may include a relationship between edge length, area and/or circumcircle radius associated with Delauney Triangles in the sequence of Delauney Triangles. Edge length may include a distance between two vertices of a Delauney Triangle. The edge length, area and circumcircle radii associated with Delauney Triangles in the sequence of Delauney Triangles may be stored in a data structure configured as a heap.

Determining a sequence of geometrical representations may include generating a sequence of geometrical representations.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 3 is a data structure that includes data related to FIG. 2.

FIG. 10B illustrates an exemplary GUI enabling a user to enter a specific beneficial objective location.

DETAILED DESCRIPTION

Figure 1:
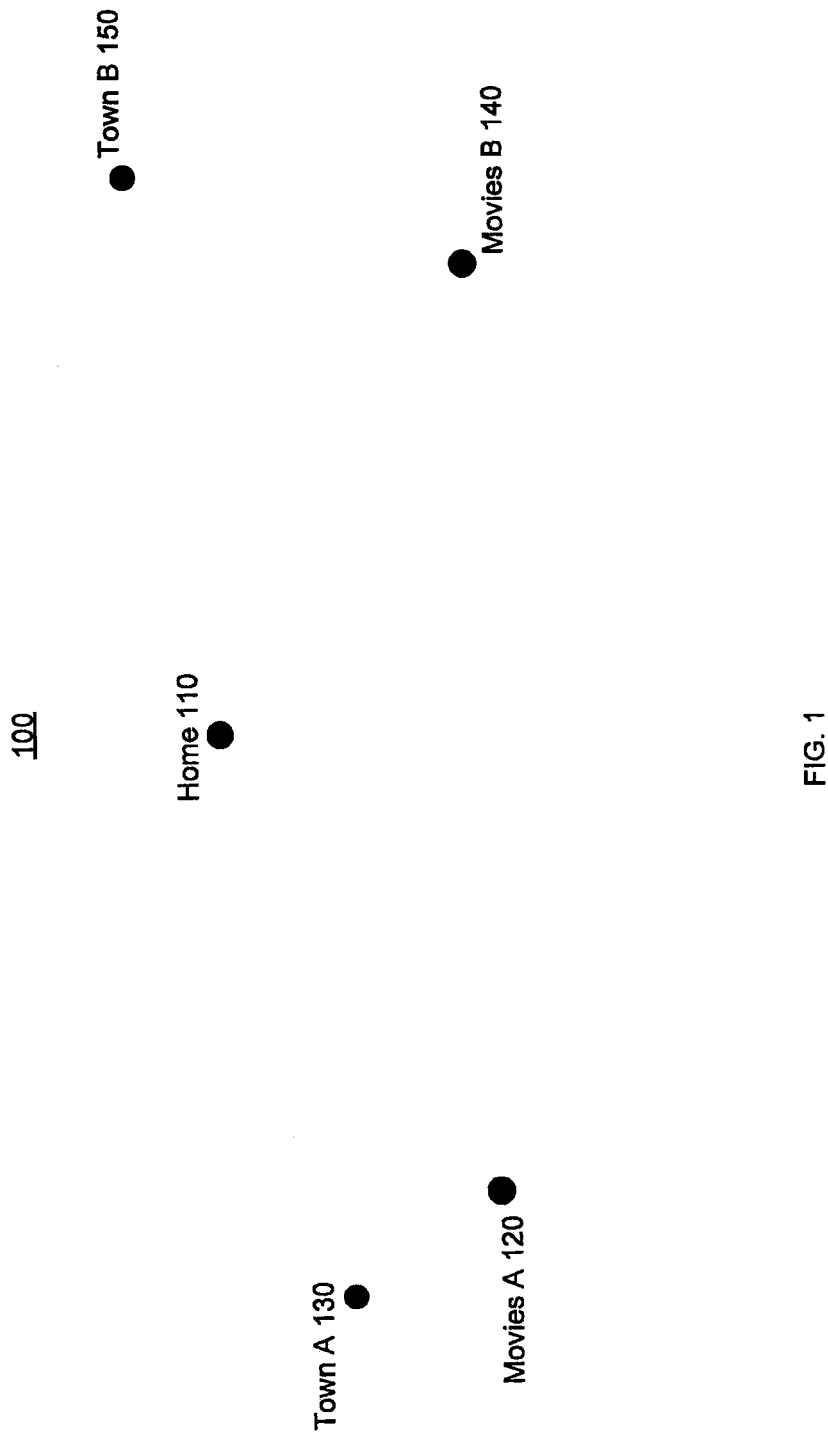
FIG. 1 is an exemplary map showing a series of location points.

A directory service may enable a user to find a desired good or service provider that is located proximate to a particular location selected by the user, such as, for example, the user's home, office, present location or another desired location. The provider returned by the directory service may be referred to as a point of interest and the user-selected location may be referred to as a source location. For example, a user may wish to find a dry-cleaner that is proximate to the user's office. Several dry-cleaners may be located within a comfortable walking distance from the user's office and a directory service may provide a list of the dry-cleaners.

However, the list of dry-cleaners provided by the directory service may not take into account a preference on the part of the user for travel in a particular direction from the user's source location. A directional preference may result from the user's desire to achieve another goal, such as, for example, visiting another location en route, avoiding high traffic areas, or traveling in one part of town over another. The user's other goal may be referred to as a beneficial objective. Thus, in addition to seeking a desired good or service provider near a user-selected location, a user also may seek a location of the desired good or service provider that satisfies a beneficial objective.

For example, a user may seek a dry-cleaner that is both proximate to the user's office and near a sandwich shop. The sandwich shop, or, more particularly, eating lunch during the user's lunch hour, may be the user's beneficial objective. In a more particular example, a user may wish to drop off the user's dirty laundry at a dry-cleaner en route to Here, visiting the user's favorite sandwich shop may be the user's beneficial objective and the location of the favorite sandwich shop may be referred to as a beneficial objective location. In this example, a dry-cleaner that is located Northeast from the user's office, preferably between the office and the sandwich shop so that the user need not carry dirty laundry into the sandwich shop, may be the service provider that is the most responsive to the user's request for a desired good or service provider because it is both proximate to the user's source location and satisfies the user's beneficial objective.

Techniques are described to provide directory service results (or points of interest) based on one or more locations selected by a user. For example, a user may seek a desired good or service provider (i.e., a point of interest) that is proximate to a location from which the user may begin traveling to the point of interest (i.e., the user's source location) and satisfies a beneficial objective held by the user (i.e., the user's other goals). In some implementations, a user may be enabled to provide more than one beneficial objective.

To quantify the beneficial objective, a user may provide a beneficial objective location. For example, a user may provide a beneficial objective of "sandwich shop," or the user may provide a beneficial objective of "my favorite sandwich shop located at 123 B Street, Washington, D.C. 20006." Thus, the beneficial objective location may be a specific location requested by the user, such as the location of the user's favorite sandwich shop. The beneficial objective location may represent a low population or light traffic area. For example, a user may seek a good or service provider outside a crowded area of town. In this example, the beneficial objective location may be a center of a low population area.

The source location may include locations other than a user's home or office, such as the user's current location, a vacation spot, a family member's home town or the location of a previous errand. The source location may be derived automatically from a mobile device such as a cell phone, personal data assistant or multimedia device. In some implementations, a directory service may include a default configuration that does not typically provide directory service results, or points of interest, that are outside a threshold distance from a user's source location.

As such, the particular point of interest provided by a directory service to the user as the point of interest that is most responsive to the user's request may take into account several different locations. For example, the desired good or service provider returned by the directory service may take into account (1) a source location, (2) a beneficial objective location and (3) locations of known good or service providers of the type requested by the user.

Thus, a geometrical representation, such as a Delauney Triangle, may be used to determine which of several locations of a desired good or service provider may be most responsive to a user's request based on the multiple locations associated with the request. In general, the process of creating Delauney Triangles among multiple points or locations, referred to as Delauney Triangulation, is the most efficient way to draw triangles between multiple points. Each point may be connected by lines to its closest neighbors such that the lines form triangles, the lines do not otherwise intersect, and none of the triangles overlap.

A Delauney Triangle may be drawn between a source location, beneficial objective location and the point of interest that is most responsive to the user's request for a desired good or service provider in that it is proximate to the source location and satisfies the beneficial objective (i.e., it is proximate or not proximate to the beneficial objective location). For example, the source location and the beneficial objective location (if the beneficial objective is to find a point of interest near another user-specified location or a high population area) may be two vertices of the Delauney Triangle, and the point of interest returned by the directory service may be the third vertex of the Delauney Triangle. In this example, the goal is to minimize the area of the Delauney Triangle having these three vertices such that the point of interest is proximate to both the source location and the beneficial objective location.

Alternatively, if the beneficial objective is to find a point of interest that is located outside a high population or high traffic area identified by a beneficial objective location, a directory service may return a point of interest result that satisfies the third vertex of a Delauney Triangle having a maximized area. Thus, the point of interest may be proximate to the source location, but not proximate to the beneficial objective location of the high population or high traffic area.

For example, a user may seek a dry-cleaner proximate to the user's office and also proximate to the user's favorite sandwich shop. In this example, a Delauney Triangle may be generated having as its three vertices (1) the office location (i.e., source location), (2) the location of the sandwich shop (i.e., the beneficial objective location) and (3) the location of the one dry-cleaner that is most responsive to the user's request (i.e., the point of interest). To determine the point of interest that is most responsive to the user's request, several Delauney Triangles may be generated, each having at its third vertex a location of a dry-cleaner that is within a certain threshold distance from the source location (e.g., within the same city, town or zip code). The Delauney Triangle having the smallest area of the generated Delauney Triangles may be determined, and the corresponding point of interest may be returned as being the most responsive to the user's request.

In another example, a user may seek a dry-cleaner that is located away from restaurants serving lunch in order to avoid waiting in line. In this example, a Delauney Triangle may be generated having as its three vertices (1) the office location (i.e., source location), (2) the population center of the town or perhaps just the center of a downtown neighborhood (i.e., the beneficial objective location) and (3) the location of the dry-cleaner that is most responsive to the user's request. As described above, several Delauney Triangles may be generated, each having at its third vertex a different location of a dry-cleaner. However, in this example, because the beneficial objective is to determine a dry-cleaner that is not proximate to the beneficial objective location, the point of interest at the third vertex of the Delauney Triangle having the largest area may be determined as the point of interest most responsive to the user's request.

Alternatively, for the same example, the beneficial objective location may be represented by the center of a town or neighborhood that has a small population or low levels of traffic. In this example, the Delauney Triangle having the smallest area may include the point of interest that is most responsive to the user's request because the point of interest may be proximate to the source location and a low population area, rather than not proximate to a high population area.

In one implementation, a user may perform a search for a desired good or service provider via a graphical user interface ("GUI"). In one configuration, the inputs to the GUI include a source location (e.g., office location), a beneficial objective (e.g., near a sandwich shop) or beneficial objective location (e.g., location of a sandwich shop), and a desired good or service provider (e.g., a dry-cleaner). The user may enter detailed location information for the source location and the beneficial objective location. The detailed location information may include a street address, two cross-streets in a particular town, a city, and/or a zip code. The detailed location information may be translated to general location information, such as a neighborhood, a town, a city, or a zip code. Alternatively, the user may enter general location information for the source location and the beneficial objective location.

Once received, the general location information for the source location and the beneficial objective location may be provided to a structured query engine. The structured query engine may enable retrieval of values related to Delauney Triangle creation, analysis and organization. In one implementation, Delauney Triangles may be generated before receipt of a source location and a beneficial objective location. Alternatively, Delauney Triangles may be generated upon receipt of a source location and a beneficial objective location.

FIG. 1 is an exemplary map showing a series of location points. More particularly, FIG. 1 illustrates an exemplary map 100 including location points representing a source location (Home 110), beneficial objective locations (Town A 130 and Town B 150) and locations related to a desired good or service provider (Movies A 120 and Movies B 140).

A user residing at Home 110 may wish to find a movie theater where the user can catch the new George Clooney film. In this example, the user may provide Home 110 as a source location. The user also may indicate a "movie theater" as a desired good or service provider. In addition to seeking a movie theater, the user may have a beneficial objective of eating dinner at a restaurant near the movie theater. Thus, the user may indicate "restaurants near the movie theater" as the user's beneficial objective.

Based on the provided beneficial objective, one or more beneficial objective locations may be determined. For the beneficial objective of eating dinner at a restaurant near the movie theater, beneficial objective locations that include many restaurants may be determined. For example, Town A 130 and Town B 150 may be identified as high population areas, and thus may include a wide variety of restaurants. As such, Town A 130 and Town B 150 may be used as beneficial objective locations.

One of Movies A 120 and Movies B 140, which represent movie theaters, may be provided to the user as a point of interest because both Movies A 120 and Movies B 140 are proximate to the source location of Home 110 and the beneficial objective locations of Town A 130 and Town B 150. To determine which of Movies A 120 or Movies B 140 may be returned to the user as the point of interest that is most responsive to the user's request, geographical representations, such as Delauney Triangles, may be used.

Figure 2:
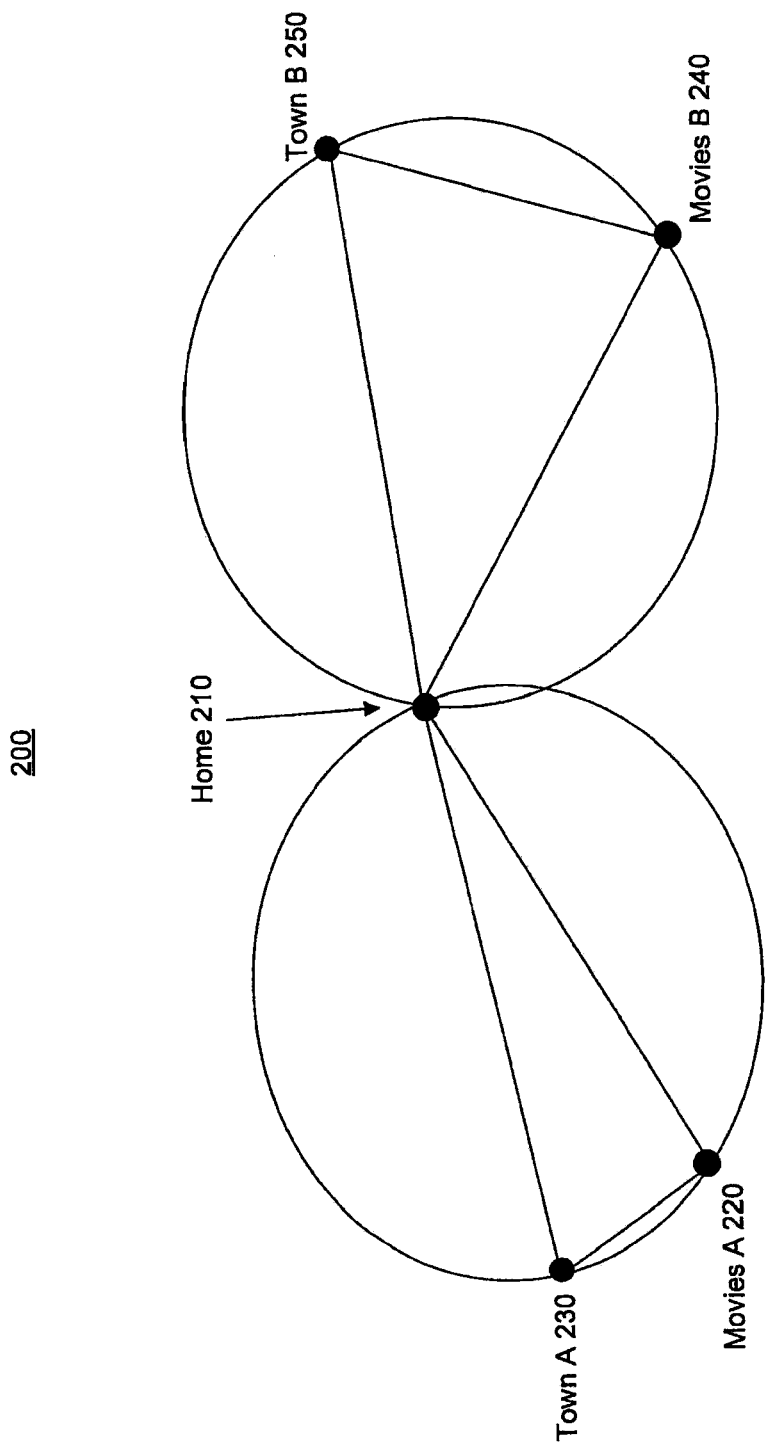
FIG. 2 is an exemplary map showing a series of location points and geometrical representations generated from the location points.

FIG. 2 is an exemplary map showing a series of location points and geometrical representations generated from the location points. More particularly, FIG. 2 includes an exemplary map 200 including location points representing a source location (Home 210), beneficial objective locations (Town A 230 and Town B 250) and locations related to a desired good or service provider (Movies A 220 and Movies B 240). Map 200 also includes geographical representations that have been generated about the location points.

More particularly, map 200 includes Delauney Triangles drawn between the location points. A Delauney Triangle may be used as a geometrical representation to determine a point of interest that satisfies a user's request for a desired good or service provider. Creating Delauney Triangles, referred to as Delauney Triangulation, may be an efficient way to associate more than one location by generating triangles between location points using lines to connect the location points. However, a geometrical representation may not be referred to as a Delauney Triangle unless the representation satisfies two properties that are referred to as the Delauney properties or principles. First, a line may be drawn from a point to the point's closest neighboring point such that all lines form triangles and no triangles overlap or intersect in any way. Second, a circumscribed circle, also referred to as a circumcircle, may be drawn around each triangle such that, apart from the vertices, there are no other points on or inside the circumscribed circle of any triangle. The Delauney Triangles of map 200 satisfy these properties.

Similar to the example described above with respect to FIG. 1, a user may seek a movie theater, such as Movies A 220 or Movies B 240, that is proximate to Home 210 and also proximate to restaurants where the user can eat dinner before the movie, represented by Town A 230 and Town B 250, both of which have been determined to be high population areas that may include a wide variety of restaurants. Once the location points have been identified, Delauney Triangles may be generated between Home 210 and each set of beneficial objective locations and locations related to a desired good or services.

Two triangles may be generated to connect the location points of map 200. Triangle A includes vertices of Home 210, Movies A 220, and Town A 230. Triangle B includes vertices of Home 210, Movies B 240, and Town B 250. Triangle A and triangle B do not intersect or overlap. A circumcircle may be generated about each of triangle A and triangle B. As shown, the only points on the circle for triangle A are the vertices of triangle A and the only points on the circle for triangle B are the vertices of triangle B. Additionally, the vertices of triangle A do not fall within the circle for triangle B and the vertices of triangle B do not fall within the circle for triangle A. As such, triangle A and triangle B may be classified as Delauney Triangles.

Because Delauney Triangles may be generated about a series of location points to determine a point of interest that is both proximate to a source location and satisfies a beneficial objective (e.g., is proximate or not proximate to a beneficial objective location), triangle A and triangle B may be the only triangles that may be generated within map 200. A triangle having at its vertices Home 210, Movies A 220 and Movies B 240, or a triangle having at its vertices Home 210, Town A 230 and Town B 250, may violate one or more of the Delauney principles. For example, an edge of a triangle having at its vertices Home 210, Town A 230 and Town B 250, may overlap or intersect with one or more of triangle A and triangle B. In addition, a triangle having at its vertices Home 210, Movies A 220 and Movies B 240, or a triangle having at its vertices Home 210, Town A 230 and Town B 250 may not be generated within map 200, and thus the potential violation of the Delauney principle need not be considered, because such a triangle would fail to include at its vertices a source location, a beneficial objective location and a potential point of interest. For example, a triangle having at its vertices Home 210, Movies A 220 and Movies B 240 does not include a beneficial objective location, and a triangle having at its vertices Home 210, Town A 230 and Town B 250 does not include a potential point of interest. Thus, neither of these triangles would be useful in determining a point of interest that is both proximate to a source location and satisfies a beneficial objective.

FIG. 3 is a data structure that includes data related to map 200 of FIG. 2. More particularly, FIG. 3 is a data structure 300 that includes parameters related to the location points (or objects), Delauney Triangles and circumcircles of map 200 of FIG. 2. A relationship between the Delauney Triangles and circumcircles of map 200 also may be perceived from the data of data structure 300.

Data structure 300 includes columns for information related to Potential Beneficial Objective Locations 310, Potential Points of Interest 320, Length of Edge Between Source Location and Potential Beneficial Objective Location 330, Length of Edge Between Source Location and Potential Point of Interest 340, and Radius of Circumcircle 350. Data structure 300 also includes row A and row B.

Data under the column for Potential Beneficial Objective Locations 310 includes Town A for row A and Town B for row B. If a user provided a beneficial objective location, such as, for example, an address of a particular restaurant, the entries in each of rows A and B may be identical. Alternatively, if a user did not specify a beneficial objective location, and merely indicated a beneficial objective of, for example, restaurants near the movie theater, entries in row A and row B may represent multiple beneficial objective locations that satisfy the provided beneficial objective.

Data under the Potential Points of Interest 320 column includes Movies A for row A and Movies B for row B. Movies A and Movies B are locations of a desired good or service provider that satisfy the user's request, and thus are potential points of interest.

Data under the Length of Edge Between Source Location and Potential Beneficial Objective Location 330 include L(BOLa) for row A and L(BOLb) for row B. L(BOLx) represents the length of the edge, or line, generated between the source location and the beneficial objective location for row x (e.g., row A or row B). Data under the Length of Edge Between Source Location and Potential Point of Interest 340 column include L(POIa) for row A and L(POIb) for row B. L(POIx) represents the length of the edge, or line, generated between the source location and the potential point of interest for row x (e.g., row A or row B). In some implementations, the length of an edge may be a true distance between location points. In other implementations, the length of an edge may be some representation of the distance between location points, such as a scaled distance value.

Data under the Radius of Circumcircle 350 column includes R(a) for row A and R(b) for row B. R(x) represents the size of a circumcircle, as represented by the radius of the circle, surrounding a particular Delauney Triangle generated between a source location, a beneficial objective location and a location related to a desired good or service of row x (e.g., row A or row B). For example, R(a) represents the radius of the circumcircle drawn about a Delauney Triangle having at its three vertices (1) Home, (2) Town A and (3) Movies A.

Although the values as shown in data structure 300 do not represent particular numeric values, the relationship between the values may determine which of the generated Delauney Triangles yields the point of interest that is most responsive to a user's request. For example, if the values relating to Triangle A are much greater than the values relating to Triangle B, such that if R(a) is significantly larger than R(b), the location related to a desired good or service provider lying at a vertex of Triangle B may be selected as the point of interest in response to the user's request in an example where the area of a triangle is to be minimized to determine a point of interest (i.e., to find a point of interest that is proximate to a source location and satisfies a beneficial objective by being proximate to a beneficial objective location).

Figure 4:
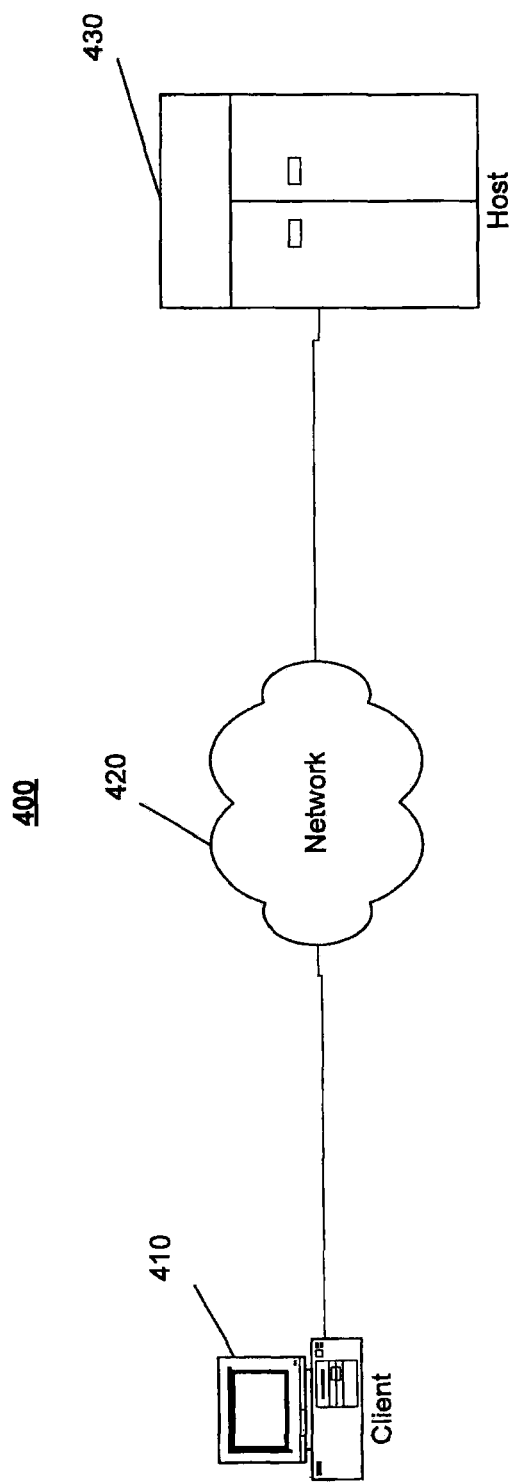
FIG. 4 is a block diagram of an exemplary communications system including a host configured to retrieve a point of interest for a client based on a source location, a desired good or service provider and a beneficial objective location.

FIG. 4 is a block diagram of an exemplary communications system 400 where a host 430 is configured to retrieve a point of interest for a client 410 based on a source location, a desired good or service provider and a beneficial objective location. Generally, the client 410 displays one or more GUIs (e.g., the GUIs described in FIGS. 10-12) to enable a user to provide a desired good or service provider, a source location and a beneficial objective or a beneficial objective location to host 430 such that a structured query engine on host 430 may retrieve a point of interest for client 410.

Each of the client 410 and the host 430 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 410 and host 430 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium that is capable of being delivered to the client 410 or the host 430.

The client 410 may include one or more devices capable of accessing content on the host 430. The host 410 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 410 includes one or more information retrieval software applications (e.g., a browser, a mail application, an instant messaging client, an Internet service provider client, a media player, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, the client 410 may include a wireless telephone running a micro-browser application on a reduced operating system with general purpose and specialized hardware capable of operating in mobile environments.

More particularly, client 410 may include one or more graphical user interfaces ("GUIs") such that a user may be provided with a point of interest in response to providing a source location, a beneficial objective (optionally including a beneficial objective location) and a desired good or service provider. The GUIs may be rendered on client 410 by, for example, a software program or an Internet webpage.

The user may enter location information into the GUI in detail or generally. In one implementation, if the user enters detailed location information, such as, for example, a street address, client 410 may translate the detailed location information into general location information, such as, for example, a town, neighborhood or zip code, before providing the location information to host 430. In another implementation, client 410 may provide the detailed location information to host 430 and host 430 may translate the detailed location information into general location information.

Similarly, the GUI may be configured to enable a user to provide either general location information or detailed location information for a beneficial objective location. Alternatively, the GUI may be configured to receive a beneficial objective that is not associated with a particular location. For example, a user's beneficial objective may be to eat dinner near a movie theater, but the user may not have a specific restaurant or location of a restaurant in mind. In yet another implementation, client 410 may be configured to provide a beneficial objective location by default, that is, without any user input. For example, client 410 may be configured to provide a beneficial objective location of a user's home when the user submits a request for a desired good or service provider around 5:00 PM on a weekday with a source location of the user's office in an attempt to guess that the user is headed home and wishes the good or service provider location returned as a point of interest to be on the way home.

The network 420 includes hardware and/or software capable of enabling direct or indirect communications between the client 410 and the host 430. As such, the network 420 may include a direct link between the client 410 and the host 430, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 430 generally includes one or more devices configured to retrieve a point of interest based on a source location, a desired good or service provider and a beneficial objective or beneficial objective location. Typically, the host 430 includes maps of various location points and a structured query engine. The host 430 may include a general-purpose computer having a central processor unit (CPU), and memory/storage devices that store data and various programs such as an operating system and one or more application programs. Other examples of a host 430 includes a workstation, a server, a special purpose device or component, a broadcast system, other equipment, or some combination thereof capable of responding to and executing instructions in a defined manner. The host 430 also may include an input/output (I/O) device (e.g., video and audio input and conversion capability) and peripheral equipment such as a communications card or device (e.g., a modem or a network adapter) for exchanging data with the network 420.

The host 430 is generally capable of executing instructions under the command of a controller. The host 430 may be used to provide content to the client 410. The controller may be implemented by a software application loaded on the host 430 for commanding and directing communications exchanged with the client 410. Other examples of the controller include a program, a piece of code, an instruction, a device, a computer, a computer system, or a combination thereof, for independently or collectively instructing the client 410 or the host 430 to interact and operate as described. The host 430 may be embodied permanently or temporarily in any type of machine, component, physical or virtual equipment, storage medium, or propagated signal capable of providing instructions to the client 410 or the host 430.

Host 430 may be configured to include a structured query engine to retrieve a point of interest in response to a user request on client 410. The structured query engine may be configured to receive the user inputs provided by client 410 via network 420 to host 430. The inputs provided to the structured query engine may include a source location, a beneficial objective (which may include a beneficial objective location) and a desired good or service provider. Location information provided to the structured query engine may include detailed location information as translated by client 410 or host 430 if provided by the user as general location information.

In response to receiving user inputs from client 410, the structured query engine may be configured to return to host 430 a point of interest that is most responsive to the user's request. To do so, the structured query engine may generate one or more geometrical representations connecting location points represented by the user's inputs. The geometrical representations may be Delauney Triangles, for example, as discussed above with respect to FIGS. 1-3. The Delauney Triangles may be generated to include the source location and the beneficial objective location as two of the vertices. The third vertex of each generated Delauney Triangle may be a good or service provider that is a potential point of interest. The good or service provider that is returned to client 410 as the point of interest may be determined based on the area of the generated Delauney Triangles.

Figure 5:
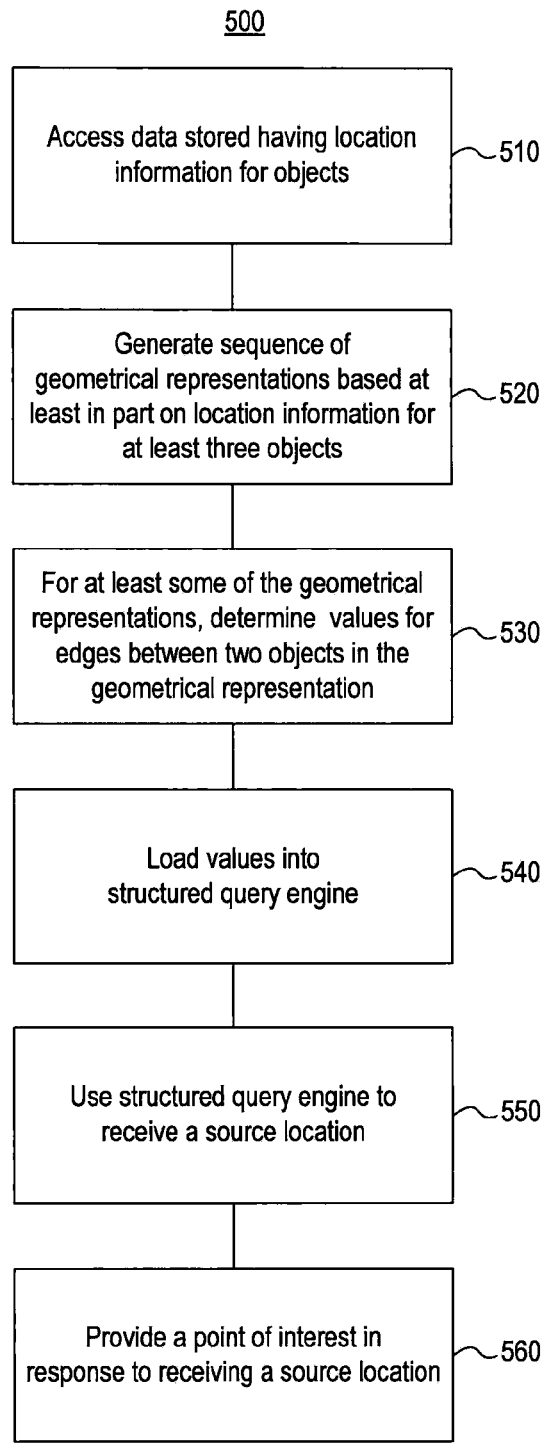
FIGS. 5 and 6 are flow charts of exemplary processes for retrieving a point of interest based on a source location.

FIG. 5 is a flow chart of an exemplary process 500 for retrieving a point of interest based on a source location. Generally, the operations shown in flow chart 500 may be used in conjunction with the systems and configurations described with respect to FIGS. 1-4. Similarly, the operations of flow chart 500 may use the GUIs described below with respect to FIGS. 10-13. For convenience, particular components described earlier, such as host 430 of FIG. 4, are referenced as performing the process. However, similar methodologies may be applied in other implementations where different components are used to define the structure of the system, or where the functionality is distributed differently among the components shown.

Initially, host 430 accesses a data store that includes location information for one or more objects (510). An object may refer to a location point, such as, for example, a source location. Location information may include detailed or general source location information, beneficial objective locations and locations related to desired good or service providers.

In some implementations, a particular object may be classified as a source location, a beneficial objective location or a desired good or service provider location depending on a user's request. For example, in a first request for a restaurant, a user may indicate a source location of Home and a beneficial objective location of Office, if the user seeks a restaurant where the user may get a bagel for breakfast on the way into the office. In a second request, however, a user may indicate a source location of Office and a beneficial objective location of Home if the user seeks a restaurant from which the user can pick up dinner on the way home. However, because the object location information in the data store is generic (that is, not related to a particular user request), an object may include information related to the object's classification (e.g., source location, beneficial objective location or desired good or service provider location) based on, for example, the classification of the object in one or more previous searches by any user, one or more previous searches by a particular user or some other criteria. For example, an address that is known to be a residence (and not a business of any sort) may not be classifiable as a good or service provider.

Host 430 generates a sequence of geometrical representations, which may be, for example, Delauney Triangles, where each geometrical representation in the sequence is based at least in part on location information for at least three objects (520). The three objects may include a source location, a beneficial objective location and a location related to a desired good or service provider. However, because the user has not yet provided a source location, beneficial objective location or a desired good or service provider related to a particular search, the three objects on which each geometrical representation in the sequence of geometrical representations is based may merely be a potential source location, a beneficial objective location and a location related to a desired good or service provider. As such, geometrical representations may be generated among all, or a subset, of the objects stored in the location information data store described above. A particular object may belong to more than one geometrical representation, particularly when the object may be any one of the three types of objects depending on the context of a user's search.

For at least some of the geometrical representations in the sequence, host 430 determines values for edges, or lines, between two objects in the geographical representation (530). For example, host 430 may determine the length of an edge between a first object and a second object or between a first object and a third object. Host 430 loads the determined values into a structured query engine (540).

Once the values are loaded, the host 430 uses the structured query engine to receive a source location related to a particular user request (550). In one implementation, host 430 may directly receive a source location as it was provided to the structured query engine by a user. In another implementation, the structured query engine may receive a detailed source location from a user, which is then translated into a general source location that is provided to host 430.

Host 430 then may determine whether the received source location includes the same location information as one of the objects on which the sequence of geometrical representations is based. Host 430 may make this determination based on a hash table that includes information about the objects in the sequence.

If so, the particular object that is a match for the source location may be associated with the received source location. If none of the objects on which the sequence of geometrical representations is based includes the same location information as the received source location, host 430 may employ techniques, such as, for example, a k-d tree, to determine an object (referred to as a closest object) within the sequence that is closer to the received source location than any other object in the sequence. A k-d tree is a multidimensional search tree that has k keys for points in k-dimensional space. Once the closest object has been determined, the closest object may be associated with the source location.

Host 430 then may provide the user with a point of interest in response to at least receiving the source location from the user, or determining the closest object. More particularly, the host 430 may identify a point of interest based on one or more geometrical representations to which at least the source location (e.g., closest object) belongs.

As an alternative to process 500, a sequence of geometrical representations, such as Delauney Triangles, may be dynamically generated after at least a source location is received from a user. In this example, the objects on which the sequence may be based are objects that correspond to information provided by the user. For example, if a user provides a source location and a beneficial objective location, host 430 may generate a sequence of geometrical representations, all of which include an object that corresponds to the source location and an object that corresponds to a beneficial objective location. There may only be one source location (since the source location is a pre-determined location), while there may be more than one beneficial object location (e.g., a user's beneficial objective may be to eat lunch at a sandwich shop before dropping off the user's dry cleaning, and as such, any sandwich shop may be a potential beneficial objective location). Once the sequence is generated, host 430 then may determine a point of interest to provide to the user based only on the geometrical representations generated for the instant, particular search.

Figure 6:
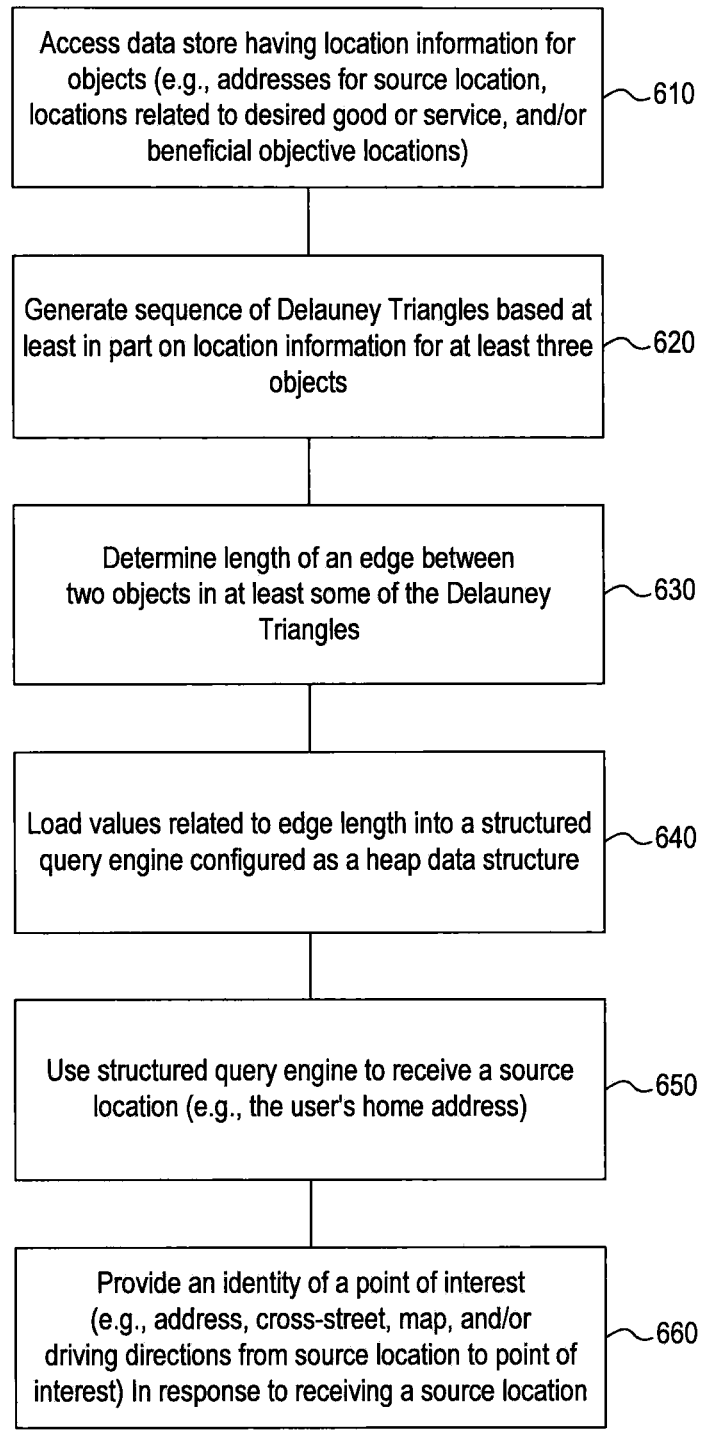

FIG. 6 is flow chart of a more detailed exemplary process 600 for retrieving a point of interest based on a source location. The operations of process 600 also may be performed by host 430 of FIG. 4.

Host 430 accesses a data store with location information for one or more objects (610). As discussed above with respect to FIG. 5, location information may include detailed or general source location information, beneficial objective locations and locations related to desired good or service providers. In other words, the location information of the data store may include location information (e.g., addresses) for a source location entered by a user. For example, the data store may include a home address for a user that may be retrieved whenever the user provides a source location of "home." Location information in the data store also may include location information for locations related to desired good or service providers, such as, for example, addresses for movie theaters within a certain threshold distance of a user's source location, which may be retrieved when a user requests a movie theater as a desired good or service provider.

Host 430 generates a sequence of Delauney Triangles, where each Delauney Triangle in the sequence is based at least in part on location information that includes at least three objects (620). The three objects may include a source location, a beneficial objective location, and a location related to a desired good or service provider. Also, as described above, in some cases the objects may only include a potential source location, beneficial objective locations and locations related to a desired good or service provider.

For at least some of the Delauney Triangles in the sequence, host 430 may determine the length of an edge between two objects in the Delauney Triangle (630). For example, host 430 may determine the length of the edge between a potential source location and a potential desired good or service provider location.

Host 430 loads the edge length values into a structured query engine (640) configured as a heap data structure. A heap is a data structure based on the notion of a complete binary tree, as described in more detail below with respect to FIG. 8.

Once the values are loaded, the host 430 uses the structured query engine to receive a source location (650). In one implementation, host 430 may directly receive a source location provided by a user to the structured query engine. For example, a user may provide a home zip code (i.e., a general source location) to be used as the source location. In another implementation, the structured query engine may receive a detailed source location that may be translated into a general source location. For example, a user may enter a complete home address to be used as the source location. In this case, the detailed source location (e.g., the user's home address) may be translated into a general source location (e.g., the city in which the user's home is located as represented, for example, by the home address zip code).

Host 430 then may access a hash table to determine whether the received source location includes location information that is the same as that associated with one of the objects on which the sequence of Delauney Triangles is based. For example, the user's source location may be a home address of 123 C Street, Washington, D.C. 20006. Host 430 may access a hash table to determine if an object includes a location of 123 C Street, Washington, D.C. 20006.

If so, the matching object may be associated with the received source location. If not, host 430 may employ a k-d tree to determine a closest object to be associated with the received source location. As described above, a closest object represents an object that is closer to the received source location than any other object in the sequence of Delauney Triangles. For example, the hash table may indicate that an object has a location of 140 C Street, Washington, D.C. 20006. The 140 C Street object may be closer to 123 C Street than any other object, and thus, may be associated with the source location.

Host 430 then may provide the user with an identity of a point of interest in response to receiving a source location from the user, and determining a matching object or a closest object for the received source location. For example, the structured query engine may determine that a particular desired good or service (e.g., the ABC movie theater) satisfies a beneficial objective (e.g., near restaurants) and is proximate to a source location (e.g., the user's home address of 123 C Street, Washington, D.C. 20006 if a matching object exists, or the closest object having a location at 140 C Street, Washington, D.C. 20006). Host 430 may provide the user with location information, such as a street address, cross-streets, and/or a map or driving directions, for the ABC movie theater as the point of interest that is most responsive to the user's request.

Similar to that described above, an alternative process may include dynamically generating a sequence of Delauney Triangles after at least a source location, such as the user's home address, is received from a user. In this example, the objects on which the sequence may be based are objects that literally correspond to information provided by the user. For example, if a user provides a source location of 123 C Street, Washington, D.C. 20006 and a beneficial objective location of "near restaurants," host 430 may generate a sequence of Delauney Triangles that each include an object that corresponds to the source location (e.g., the user's home address) and an object that corresponds to a beneficial objective location (e.g., the location of a town or neighborhood center that has been determined to include a variety of restaurants). There may only be one source location (since the source location is a pre-determined location), while there may be more than one beneficial object location (e.g., any town or neighborhood center that includes a variety of restaurants may be a potential beneficial objective location). Once the sequence is generated, host 430 then may determine a point of interest to provide to the user based only on the geometrical representations generated for the instant, particular search.

Figure 7:
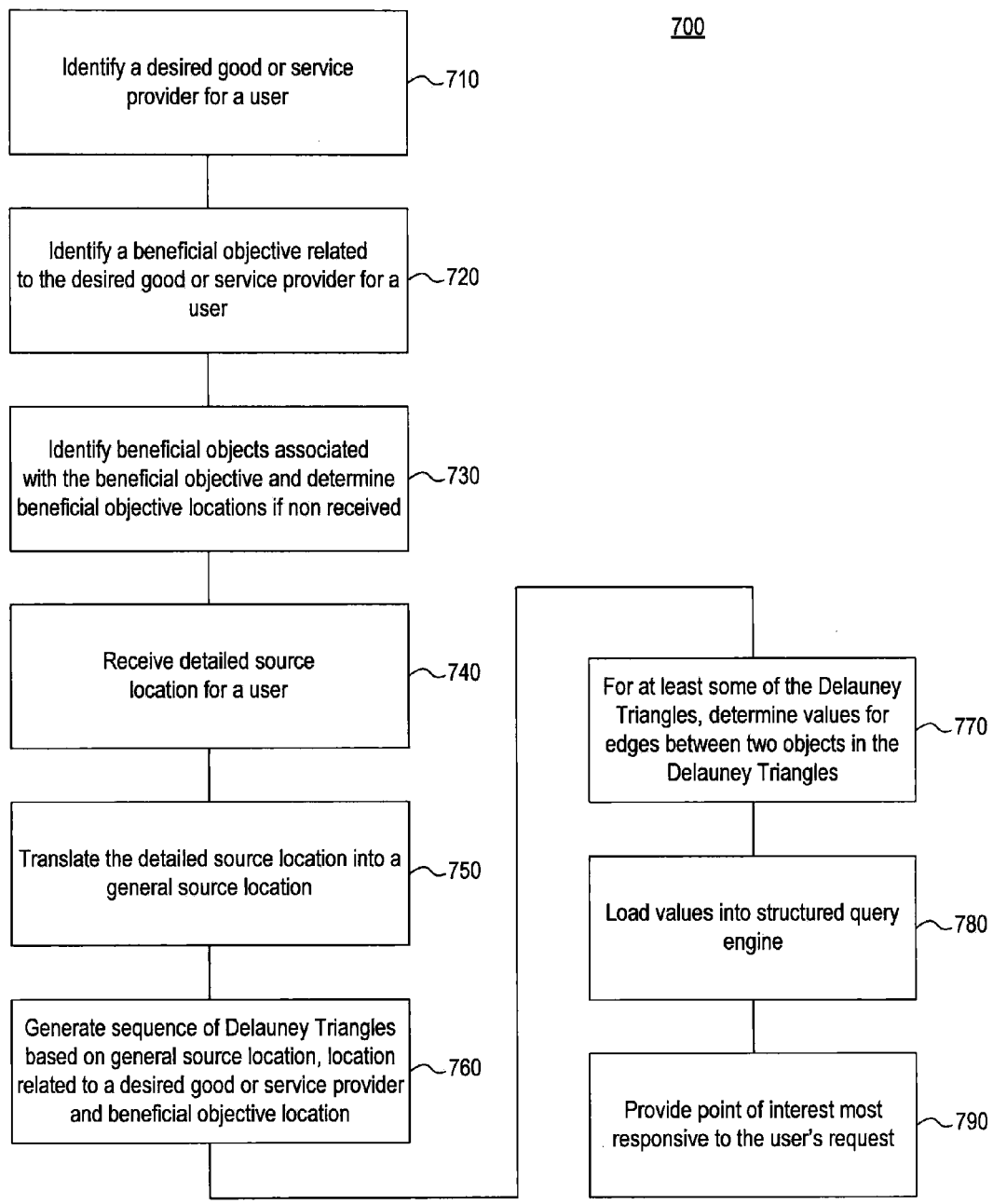
FIG. 7 is a flow chart of an exemplary process for retrieving a point of interest based on a source location and a beneficial objective.

FIG. 7 is a flow chart of an exemplary process 700 for retrieving a point of interest based on a source location and a beneficial objective. The operations of process 700 also may be performed by host 430 of FIG. 4.

During the operations of processes 500 and 600, host 430 retrieves a point of interest based on a source location. During the operations of process 700, host 430 retrieves a point of interest based on a source location and a beneficial objective or a beneficial objective location.

Host 430 identifies a desired good or service provider for a user (710). For example, a user may provide "movie theater" as a desired good or service provider.

Host 430 identifies a beneficial objective related to the desired good or service provider for the user (720). In some implementations, a user may provide a beneficial objective location, such as, for example, a name or location of a particular restaurant, the user's office, or a particular corner or pair of cross-streets. In another example, a user may indicate a preference for a high or low population area as a beneficial objective in order to avoid traffic and long lines (such as may occur in a high population area) or ensure there are plenty of activities near the desired good or service provider (such as also may occur in a high population area). In this case, host 430 may access a data store that includes objects to be used as beneficial objective locations for high or low population areas.

In some implementations, a user may provide a beneficial objective that is not related to a particular location. For example, a user may provide a beneficial objective that is, itself, a good or service provider, but is different than the desired good or service provider provided by the user in the request. For example, the user may provide "near Chinese restaurant" as the user's beneficial objective, while the desired good or service provider is a dry-cleaner. In other implementations, a beneficial objective may be inferred for a user by host 430. For example, and as described above, host 430 may be configured to provide a beneficial objective location of a user's home address and a source location of the user's office when the user submits a request for a desired good or service provider around 5:00 PM on a weekday in an attempt to guess that the user is headed home and wishes the good or service provider location returned as a point of interest to be on the way home.

Host 430 identifies beneficial objects associated with a beneficial objective and determines beneficial objective locations associated with the beneficial objective when none have been received from the user (730). If a user has provided a beneficial objective location, beneficial objects may be limited to the one beneficial object related to the particular beneficial objective location specified. If no beneficial objective location has been provided, for example, if the user has entered "near Chinese restaurant" as a beneficial objective, host 430 may identify at least one beneficial object and related beneficial objective location for the beneficial objective. In other words, host 430 may identify one or more particular Chinese restaurants that are proximate to the desired good or service provider as beneficial objects, and the locations of the Chinese restaurants as beneficial objective locations.

Host 430 may receive a detailed source location for a user (740). In some implementations, a user may enter a home address as a source location. The home address may include detailed source location information, such as a street address, city, state, and zip code. In some implementations, a user may indicate that "home" is the user's source location. Location information related to "home" may be stored in a data store and retrieved for use as the source location in this scenario. For example, the user's detailed home address may be retrieved in response to the user entering "home" as a source location.

In response to receiving a detailed source location, host 430 translates the detailed source location into a general source location (750). For example, if a source location includes a particular address, such as a user's home address, host 430 may translate the particular address into general source location information that includes cross-streets, a neighborhood, a town, a city, a state or a zip code. Alternatively, a user may provide general source location information rather than detailed source location information. In this implementation, host 430 may not translate the source location information provided by the user into detailed source location information, but may still translate the source location into another format.

Host 430 generates a sequence of Delauney Triangles based on a source location, a location related to a desired good or service provider and a beneficial objective location (760). More particularly, more than one Delauney Triangle may be generated such that the vertices of the triangles include the source location, a location related to a desired good or service provider, and a beneficial objective location. For example, one such Delauney Triangle may include a user's home location, a location related to the ABC Movie Theater, and a location related to the Good Food Chinese Restaurant as the vertices of the triangle.

In implementations where a sequence of Delauney Triangles is generated prior to receipt of a particular search by a user, once the general source location is determined, host 430 may access a hash table to determine if an object on which the sequence of Delauney Triangles is based includes the same location information as the general source location information. If so, the matching object may be the identified as the source location. If not, host 430 may use a k-d tree, as described above, to determine a closest object to be used as the source location. In either case, any point of interest that may be returned to the user will be one of the vertices of a Delauney Triangle that has the determined matching or closest object as one of its other vertices. In some implementations, Delauney Triangles that include the matching object or the closest object as a vertex may be the only Delauney Triangles generated in the sequence.

Regardless of when the sequence of Delauney Triangles is generated, for at least some of the Delauney Triangles in the sequence, host 430 determines values for edges between two objects in the Delauney Triangle (770). For example, the length of the edge between a source location and a beneficial objective location or the length of an edge between a source location and a location related to a desired good or service provider may be determined. The edge values are loaded into a structured query engine (780). For example, length information for the edges in the sequence of Delauney Triangles may be loaded into a structured query engine.

The structured query engine provides a point of interest that is most responsive to the user's request (790). In other words, the structured query engine may determine, based on the edge length information, that a particular good or service provider is most responsive to the user's request for a desired good or service provider in that it is proximate to the user's source location and satisfies the user's beneficial objective. For example, the structured query engine may determine that the ABC Movie Theater is most responsive to the user's request for a movie theater because it is proximate to the user's home and also near a Chinese restaurant. In some implementations, the structured query engine may provide a beneficial objective location in addition to providing a point of interest. For example, the structured query engine may provide both a point of interest of "ABC Movie Theater" and a beneficial objective location of "Good Food Chinese Restaurant."

FIGS. 8A-8D are block diagrams of a dynamic heap data structures 800. Data structures may be used to store a collection of information in computer memory. The information may be stored in the data structure such that a host, such as host 430, may easily access a particular portion of the information in the collection using an identifier that has been associated with the particular portion of the information.

Data structures may be static or dynamic. Static data structures require that the maximum number of data items that may be stored in the collection is known when the data structure is created. In contrast, data items may be added to, or deleted from, a dynamic data structure after the dynamic data structure has been created. Lists, stacks, arrays and trees are all examples of a dynamic data structure.

A heap, which is a special type of tree data structure, is also an example of a dynamic data structure. The simplest tree data structure is a binary tree. Binary trees have a node at the top, called a root node, and left and right sub-trees that are themselves binary trees. For example, in heap (or tree) 800 of FIG. 8A, node Z is the root node of heap 800 of FIG. 8A and nodes L and R are the root nodes of the left and right sub-trees, respectively.

A complete tree is also a type of tree data structure. A tree may include one or more leaves. A leaf refers to any node in the lowest level of the tree that is not a root of any sub-tree. In a complete tree, each leaf is the same distance or height from the root node. For example, in heap 800 of FIG. 8A, nodes A, J, E and Y are each the same distance (e.g., 2 levels) from root node Z, and thus, each of nodes A, J, E and Y is a leaf of heap 800.

A heap is a binary tree, specifically a complete binary tree, that has the heap property. A tree has the heap property if, and only if; (1) the tree is empty or (2) a key associated with each node of the tree is larger than a key associated with one of the two children of the node and both sub-trees have the heap property. A key associated with a node is an identifier that relates to a priority of a node. For example, the key associated with root node Z ("key(Z)"), is greater than the keys associated with either child node L ("key(L)") or child node R ("key(R)"). In other words, key(Z)>key(L) and key(Z)>key (R).

Figure 8A:
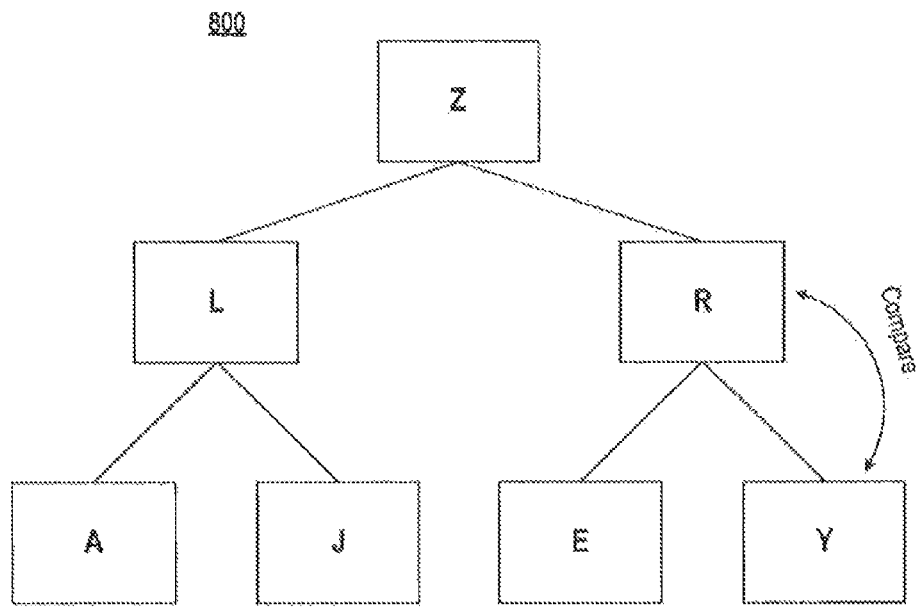
FIGS. 8A-8D are block diagrams of a dynamic heap data structure.

The data items stored in heap 800 of FIG. 8A as nodes may be values associated with Delauney Triangles in the sequence generated by host 430. Each node may include information related to an attribute of a particular triangle. For example, node L may include information related to an attribute of a triangle L. An attribute of a triangle may include features of the triangle, such as lengths of edges between two vertices of the triangle, a sum of the lengths of the three edges in the triangle, a radius of a circumcircle of the triangle, an area of the triangle, a distance between a triangle vertex that represents a source location to another vertex in the triangle, or some combination of features.

The attribute of a first triangle may be compared to the attribute of a second triangle to determine a point of interest for a user. For example, if a user seeks a dry-cleaner near a sandwich shop where the user's source location is the user's office, a Delauney Triangle that includes vertices that are closer to each other than the vertices of any other Delauney Triangle in the sequence may be selected as the Delauney Triangle that includes the point of interest that may be returned to the user. The edge lengths, sum of edge lengths, circumcircle radius, area or some combination of these features can be used to determine which Delauney Triangle should be selected. Thus, the attribute of a particular triangle, and the node in data structure 800 of FIG. 8A that includes information related to the attribute for the particular triangle, may be used to determine which triangle to select, and, ultimately, the point of interest to return to the user. The node of heap 800 that includes information related to the attribute of the triangle that is most likely to be selected may include a higher priority, and thus a larger key, than the nodes associated with other triangles in the sequence of Delauney Triangles.

A feature may be weighted before being added to an attribute. For example, movie theaters that serve popcorn with butter may be weighted in order to allow a Delauney Triangle that includes a buttered popcorn-serving movie theater at one of its vertices to have a higher priority than a Delauney Triangle that includes a movie theater that does not sell buttered popcorn at a vertex. Thus, the Delauney Triangle that includes the buttered popcorn-serving movie theater is more likely to be the Delauney Triangle that may be selected to provide the point of interest to a user.

To determine which Delauney Triangle includes the point of interest that is most responsive to a user's request (and thus will be returned to the user), the attributes of the Delauney Triangles in the sequence may be compared with one another. More particularly, the attributes included in the nodes of heap 800 of FIG. 8A may be compared, and re-organized, such that the resultant heap, such as heap 800 of FIG. 8B, may have as its root node the Delauney Triangle that includes the point of interest to be returned to the user. This re-organization may be described in the context of adding a new node to the heap. For example, once the sequence of Delauney Triangles has been generated by host 430, the attribute of each triangle, as represented by the nodes, may be added to heap 800 one at a time.

Figure 8B:
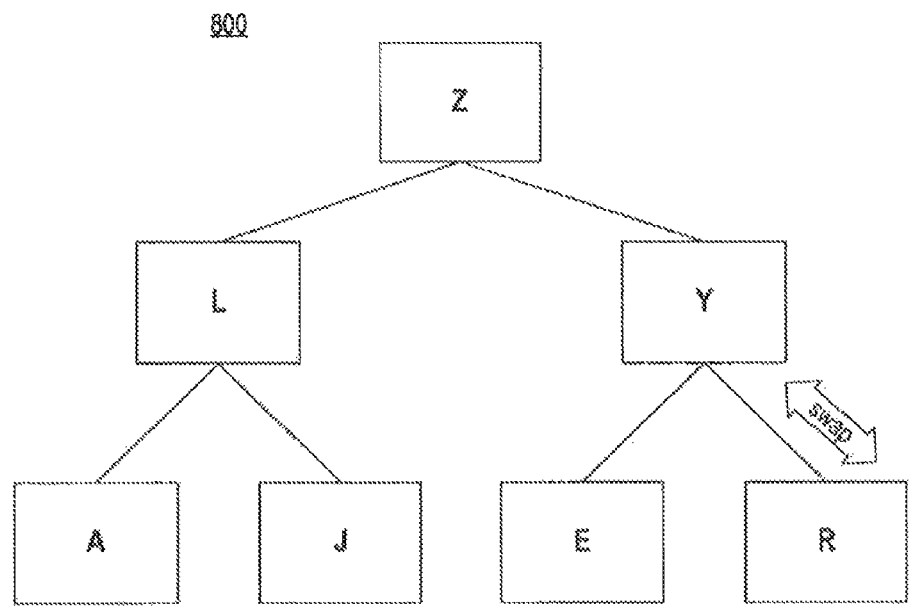

More particularly, node Y may be the last node to have been added to heap 800 of FIG. 8A. As described previously, the heap property requires the key associated with each node of the tree to be larger than the key associated with one of the two children of the node. A key associated with a node is an identifier that relates to a priority of a node. A node includes a higher priority if the Delauney Triangle associated with the attribute represented by the node lends itself to being a Delauney Triangle that is more likely than other Delauney Triangles to be selected as the triangle that includes the point of interest that may be returned to the user. Thus, as shown in FIG. 8A, the key of node Y ("key(Y)") may be compared to the key of its parent node R ("key(R)") to determine if the key for node Y is larger than the key for node R. In this case, and as illustrated by FIG. 8B, the key for node Y is larger than the key for node R, such that key (Y)>key (R). Thus, node Y and node R swap locations in heap 800 so that node Y becomes the parent node and node R becomes the child node. At this point, the key for node Y ("key(Y)") also may be compared with the key for node Z ("key(Z)"). However, in the present example, the key for node Z is still larger than the key for node Y, such that (key(Y)<key(Z), and node Y may remain in the location shown in heap 800 of FIG. 8B.

Figure 8C:
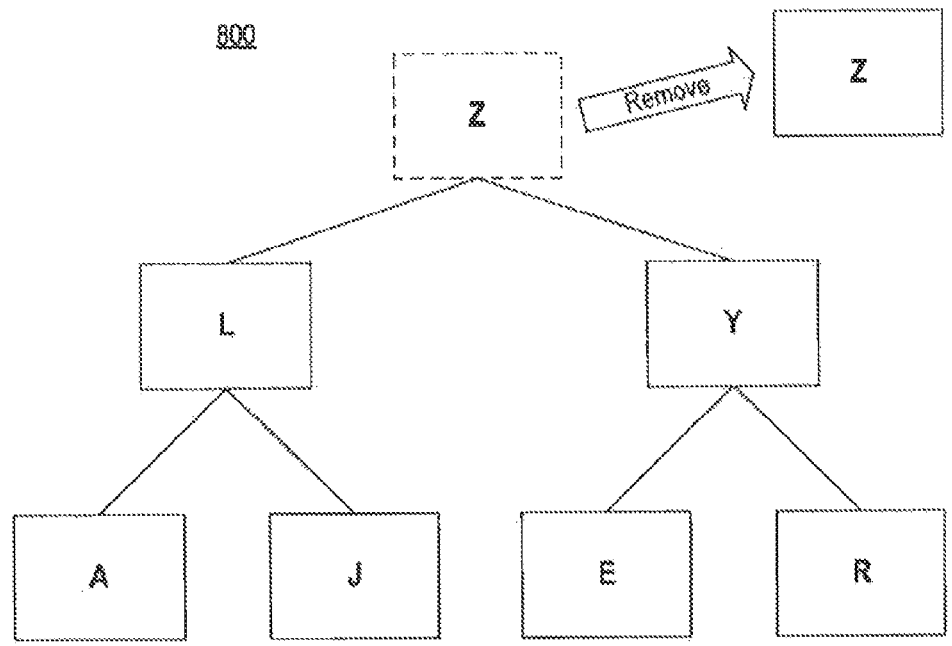

Once all nodes have been added to heap 800, and have been re-organized so that the heap maintains the heap property, the structured query engine may extract the root node Z (i.e., the highest priority node) from heap 800 of FIG. 8C. As such, the structured query engine may determine the desired good or service provider that is included as a vertex of the Delauney Triangle associated with the attribute included in node Z, and thus provide the user with the point of interest that is most responsive to the user's request.

In this way, a heap may be used as a priority queue because the highest priority data item may be at the root (e.g., root node Z, which has the largest key). As the highest priority data item in the information collection, the root node is most likely the one data item that will be accessed, and thus extracted, or deleted, from the heap.

Figure 8D:
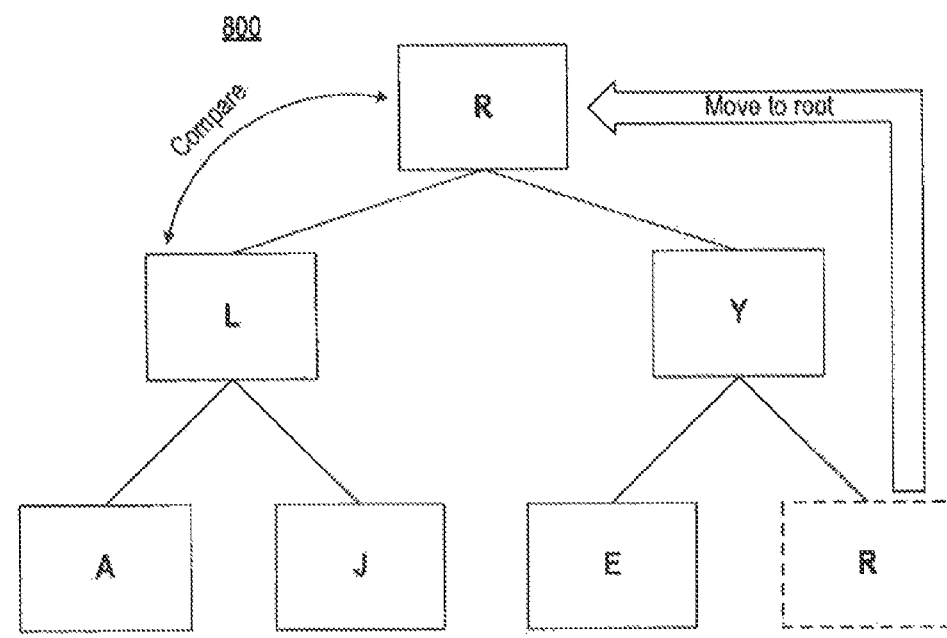

Once the root node is deleted, there is no longer a single tree having the heap property, but rather only the left and right sub-trees remain. Therefore, the heap must be re-created before any other data items may be extracted. To re-create the heap after node Z is removed from heap 800 of FIG. 8C, the last node of the heap (e.g., node R) may be moved to the root position, as illustrated in FIG. 8D. The key for the new root node R ("key(R)") of heap 800 of FIG. 8D then may be compared with the key of the left sub-tree root node L ("key (L)") and key of the right sub-tree root node Y ("key(Y)") to determine if the key for node R is larger than the keys for either node L or node Y. If so, such that key(R)>key(Y) and key(R)>key(L), node R remains as the root node. If not, such that key(R)<key(Y) or key(R)<key(L), node R is swapped with the child node that includes the larger key. The process may be repeated until the heap property is restored or node R reaches the lowest level of the heap, such that node R is a leaf.

In one implementation, heap 800 may store an attribute for each Delauney Triangle in the sequence. In another implementation, heap 800 may store attributes for a subset of Delauney Triangles in the sequence. In yet another implementation, heap 800 may store an attribute for only one Delauney Triangle in the sequence and other heaps may be used to store values associated with other Delauney Triangles in the sequence.

Figure 9:
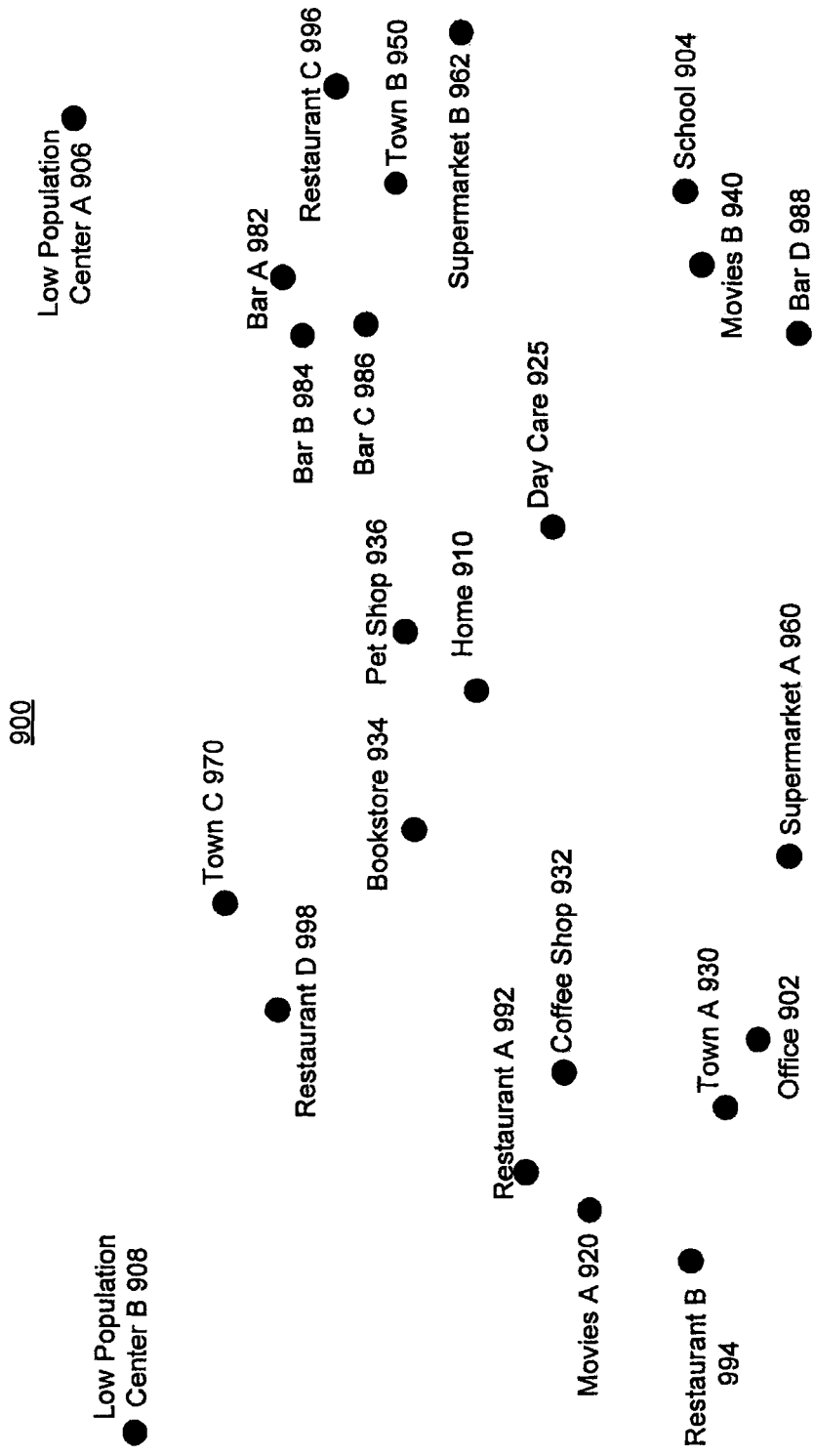
FIG. 9 is an exemplary map showing a series of location points.

FIG. 9 is an exemplary map 900 showing a series of location points related to a source location, more than one location related to a desired good or service provider and more than one beneficial objective location. Map 900 illustrates how a landscape of locations related to a desired good or service provider and beneficial objective locations may exist prior to generating Delauney Triangles between particular location points in order to determine a point of interest that is most responsive to a user's current or future request. In one implementation, Delauney Triangles may be generated among location points before a user requests a point of interest. In another implementation, Delauney Triangles may be generated only after a user has requested a point of interest by entering the location information mentioned above. However, in both cases, the landscape of location points illustrated by map 900 may exist prior to generating the sequence of Delauney Triangles.

Map 900 includes a series of location points that include source locations, locations related to a desired good or service provider and beneficial objective locations. More particularly, the location points of map 900 include Office 902, School 904, Low Population Center A 906, Low Population Center B 908, Home 910, Movies A 920, Day Care 925, Town A 930, Coffee Shop 932, Bookstore 934, Pet Shop 936, Movies B 940, Town B 950, Supermarket A 960, Supermarket B 962, Town C 970, Bar A 982, Bar B 984, Bar C 986, Bar D 988, Restaurant A 992, Restaurant B 994, Restaurant C 996, and Restaurant D 998.

In some cases, a particular location shown on map 900 may serve as any one of the three location types depending on a user's request. For example, on Monday, a user whose current location is the user's home may seek a movie theater near the user's office. In this case, the source location is Home 910, the beneficial objective is "close to the user's office," and thus a beneficial objective location is Office 902, and the desired good or service provider is "movie theater" so the potential locations related to the desired good or service provider may be Movies A 920 or Movies B 940. On Tuesday, the same user, whose current location is now the user's office, may seek a restaurant in a high population area with lots of stores so that the user may window shop after dinner. At this point, the source location is Office 902, the beneficial objective is "high population area," so a beneficial objective location may be Town A 930, Town B 950 or Town C 970, and the desired good or service provider is "restaurant," so potential locations related to the desired good or service provider may be Restaurant A 992, Restaurant B 994, Restaurant C 996 or Restaurant D 998. On Wednesday, the same user, whose current location is now the school where the user takes classes after work, seeks a bookstore near a restaurant. The source location is School 904, the beneficial objective is "near a restaurant," so the beneficial objective location may be Restaurant A 992, Restaurant B 994, Restaurant C 996 or Restaurant D 998, and the desired good or service provider is "bookstore," such that the only potential location related to the desired good or service provider is Bookstore 934.

This example illustrates how the same location point may be a source location or a beneficial objective location. On Monday, Home 910 is the source location and Office 902 is the beneficial objective location since the beneficial objective is "near the user's office." On Tuesday, however, Office 902 is now the source location. Similarly, on Tuesday, the beneficial objective of "near a restaurant" leads to beneficial objective locations that may be Restaurant A 992, Restaurant B 994, Restaurant C 996 or Restaurant D 998. However, on Wednesday, the user seeks a restaurant, so now Restaurant A 992, Restaurant B 994, Restaurant C 996 or Restaurant D 998 may be a location related to a desired good or service provider.

Figure 10A:
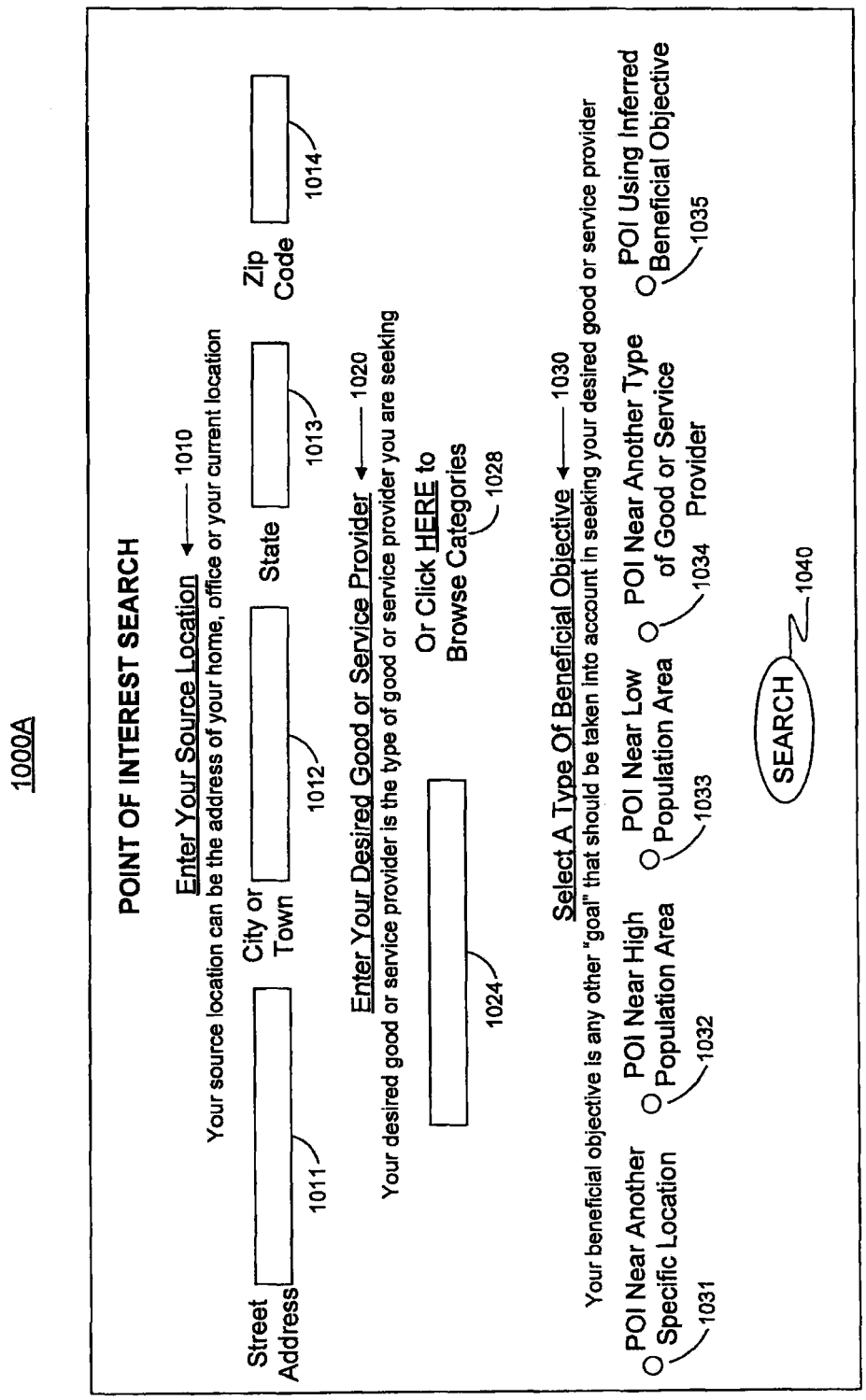
FIG. 10A illustrates an exemplary graphical user interface (GUI) enabling a user to enter a source location, a point of interest type and a beneficial objective type in order to retrieve a point of interest.

FIG. 10A illustrates an exemplary graphical user interface (GUI) 1000A that enables a user to enter a source location, a point of interest type and a beneficial objective type in order to retrieve a point of interest. GUI 1000 includes user instructions 1010, 1020 and 1030 for soliciting information to request a point of interest, and text entry boxes, such as text entry box 1011, and selection controls, such as selection control 1031, for a user to provide information to request a point of interest. GUI 1000A also includes "Search" button 1040 that may be selected by a user when the user has provided sufficient information for a point of interest to be returned.

User instruction 1010 relates to a user's source location and instructs the user to "Enter Your Source Location." User instructions 1010 also explain to the user "Your source location can be the address of your home, office or your current location." A user may enter detailed source location information, such as the address of the user's source location, by typing a street address into text entry box 1011, a city or town into text entry box 1012, a state into text entry box 1013, and a zip code into text entry box 1014. In another implementation (not shown), a user may have an option to enter general source location information rather than detailed source location information by merely providing, for example, cross-streets, a neighborhood, a town, a city, a state, or a zip code.

User instruction 1020 relates to the desired good or service provider sought by a user. User instruction 1020 instructs the user to "Enter Your Desired Good or Service Provider" and further explains to the user that "Your desired good or service provider is the type of good or service provider you are seeking." The point of interest is a location related to a desired good or service provider that is the most responsive to the user's request. A user may provide a desired good or service provider by typing a keyword or subject matter indication related to the desired good or service provider in text entry box 1024. Alternatively, a user may select hyperlink 1028, which instructs a user to "Click HERE to Browse Categories," located to the right of text entry box 1024, to browse categories of good and service providers. The user then may select a desired good or service provider from one of the categories presented (not shown). For example, a user seeking a Chinese restaurant may enter "Chinese restaurant" in text entry box 1024 or may select hyperlink 1028 and select "Chinese restaurant" from a food-related category of good or service providers.

User instruction 1030 relates to a user's beneficial objective in seeking a point of interest. User instruction 1030 instructs the user to "Select a Type of Beneficial Objective" and further explains to the user that "Your beneficial objective is any other 'goal' that should be taken into account in seeking your desired good or service provider." A user may select a beneficial objective type by choosing one of selection controls 1031-1035.

A user may choose selection control 1031 if the user's beneficial objective is to find a point of interest near another specific location. For example, a user may seek a Chinese restaurant near a day care center where the user must first pick up the user's child before having dinner.

A user may choose selection control 1032 if the user's beneficial objective is to find a point of interest near a high population area. For example, a user seeking a Chinese restaurant may wish to window shop after eating and thus would like to find a Chinese restaurant in an area where there may be a wide variety of nearby shops.

A user may choose selection control 1033 if the user's beneficial objective is to find a point of interest near a low population area. For example, a user seeking a Chinese restaurant may wish to avoid traffic and long lines so that the user may pick up a pre-ordered take out meal and then quickly return home.

A user may choose selection control 1034 if the user's beneficial objective is to find a point of interest near another type of good or service provider. For example, a user may wish to find a Chinese restaurant that is near an ice cream shop so that the user may take a walk after dinner and have dessert along the way. Selection control 1034 is different from selection control 1031 in that when a user chooses selection control 1031, the user may wish to find a point of interest near a specific location, such as a particular ice cream shop. However, when a user chooses selection control 1034, the user is seeking a point of interest near another type of good or service provider, such as any shop that sells ice cream, but does not have a specific good or service provider in mind.

Finally, a user may choose selection control 1035 if the user wishes the point of interest search system to infer a beneficial objective for the user when providing a point of interest to the user. For example, an inferred beneficial objective simply may include proximity to a user's source location. Another example includes an inferred beneficial objective of non-proximity to a high population area (or proximity to a low population area) if the user's request is made during rush hour so the user may avoid traffic. Yet another example of an inferred beneficial objective may include some relation to a previous request for a point of interest made by the same user, such as finding a point of interest in a neighborhood where the user's last source location, beneficial objective location or location related to a desired good or service provider (in this case, the ultimate point of interest provided to the user) were located based on the assumption that the user may prefer to re-visit an area with which the user is already familiar.

Once the user has provided a source location, provided or selected a desired good or service provider and selected a beneficial objective type, the user may select search button 1040 to begin the point of interest search.

FIG. 10B illustrates an exemplary GUI 1000B enabling a user to enter a specific beneficial objective location. GUI 1000B may be provided to a user when the user activates selection control 1031 to indicate that the user's beneficial objective relates to finding a point of interest near another specific location. GUI 1000B includes user message 1050, user instruction 1060, text entry boxes 1061-1064 associated with user instruction 1060, and "Search" button 1070.

User message 1050 informs a user that "You have selected a beneficial objective type that requires more information." In this case, the user has selected a beneficial objective of finding a point of interest near another specific location. User instruction 1060 instructs the user to "Enter The Location Related To Your Beneficial Objective." A user may enter an address for the specific location related to the beneficial objective by typing a street address into text entry box 1061, a city or town into text entry box 1062, a state into text entry box 1063, and a zip code into text entry box 1064. In another implementation (not shown), GUI 1000B may enable a user to enter more general location information for the specific location the user had in mind as a beneficial objective, where the general location information may include, for example, cross-streets, a neighborhood, a town, a city, a state, or a zip code. In yet another implementation (not shown), GUI 1000B may be configured to enable a user to indicate a particular location by name, such as, for example, the name of a restaurant or a store, instead of providing an address associated with the restaurant or store. In this configuration, the location of the restaurant or store may be determined by host 430 during or prior to generation of the Delauney Triangles and determination of the point of interest that is most responsive to the user's request.

Once the user has entered the location information, the user may select search button 1070 to continue the point of interest search.

For example, a user may seek a Chinese restaurant near a day care center where the user picks up the user's child prior to having dinner at the Chinese restaurant. In this case, the user would choose selection control 1031 in GUI 1000A. The user may then be presented with GUI 1000B where the user may enter the address of the day care center (or alternatively, the general location of the day care center or the name of the day care center) into text entry boxes 1061-1064. The user then may select search button 1070 to continue the point of interest search for a Chinese restaurant that satisfies the user's beneficial objective of being near the day care center.

Figure 10C:
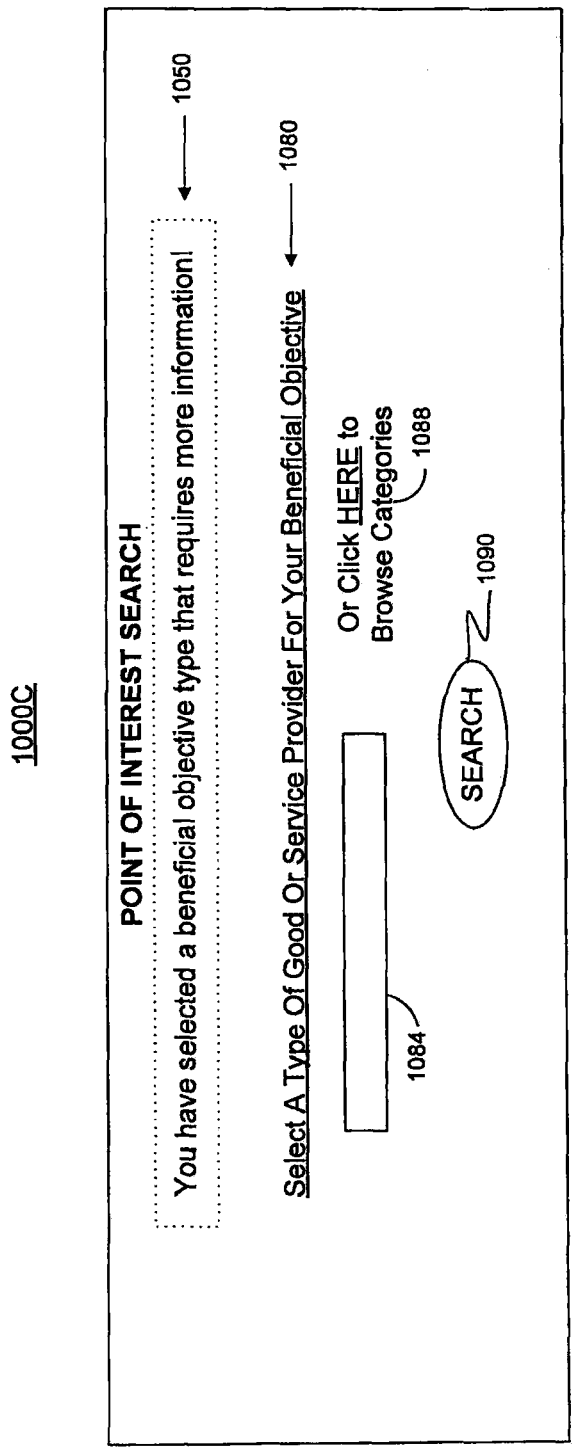
FIG. 10C illustrates an exemplary GUI enabling a user to enter a specific type of good or service provider related to a beneficial objective.

FIG. 10C illustrates an exemplary GUI 1000C enabling a user to enter a specific type of good or service provider related to a beneficial objective. GUI 1000C may be provided to a user upon selection of selection control 1034 of GUI 1000A to indicate that the user's beneficial objective is related to finding a point of interest near another type of good or service provider. GUI 1000C includes user message 1050, user instruction 1080, text entry box 1084 and hyperlink 1088 associated with user instruction 1080, and a "Search" button 1090.

User message 1050, as in GUI 1000B, informs a user that "You have selected a beneficial objective type that requires more information." In this case, the user has selected a beneficial objective of finding a point of interest near another type of good or service provider. User instruction 1080 instructs the user to "Select A Type Of Good Or Service Provider For Your Beneficial Objective." A user may enter a type of good or service provider by typing a keyword or subject matter indication of that good or service provider in text entry box 1084. Alternatively, a user may select hyperlink 1088, which instructs a user to "Click HERE to Browse Categories," located to the right of text entry box 1084, to browse categories of good and service providers. The user then may select a type of good or service provider from the categories presented (not shown).

Once the user has provided the desired type of good or service provider as a beneficial objective, the user may select search button 1090 to continue the point of interest search.

For example, a user may seek a Chinese restaurant near an ice cream shop so that the user may have dinner and dessert within walking distance of one another. In this case, the user may choose selection control 1034 of GUI 1000A. The user then may be presented with GUI 1000C where the user may provide "ice cream shop" into text entry box 1084. Alternatively, the user may click on hyperlink 1088 and select "ice cream shop" from a food-related category of good or service providers. The user then may select search button 1090 to continue the point of interest search for a Chinese restaurant that satisfies the user's beneficial objective of being near an ice cream shop.

Figure 11:
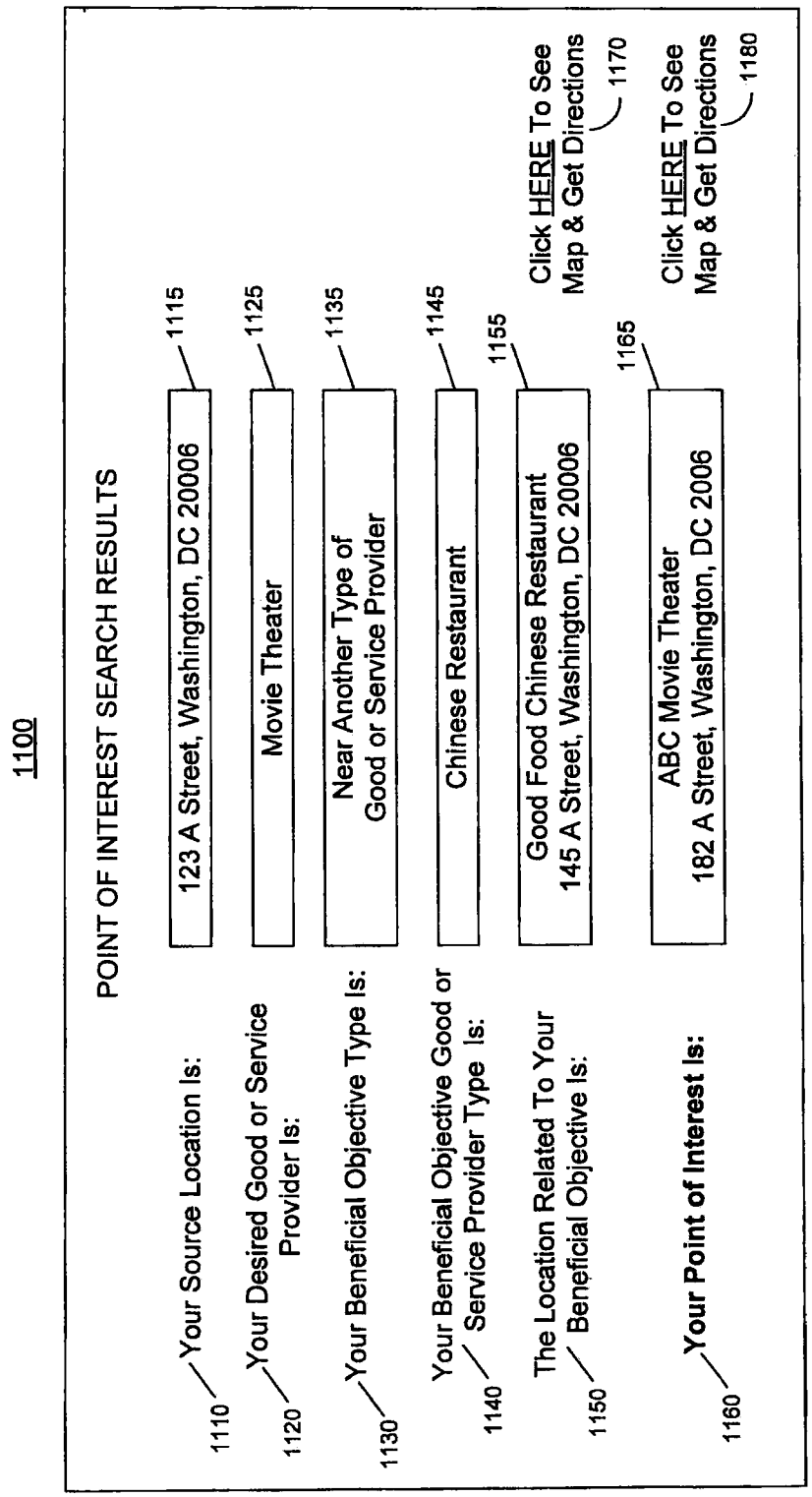
FIG. 11 illustrates an exemplary GUI enabling a user to perceive point of interest results retrieved based on information provided by the user.

FIG. 11 illustrates an exemplary GUI 1100 enabling a user to perceive point of interest results retrieved based on information provided by the user. GUI 1100 includes result label 1110 and associated result box 1115, result label 1120 and associated result box 1125, result label 1130 and associated result box 1135, result label 1140 and associated result box 1145, result label 1150 and associated result box 1155, result label 1160 and associated result box 1165, and hyperlinks 1170 and 1180.

Once a user has provided the information requested by GUI 1000A, and GUI 1000B and GUI 1000C, if necessary, GUI 1100 provides a point of interest to the user that is most responsive to the user's request. GUI 1100 also may provide the user with other information related to the point of interest, such as a source location and a beneficial objective location.

GUI 1100 includes result label 1110 "Your Source Location Is:" to identify result box 1115 that displays detailed location information related to the user's source location. For example, result box 1115 displays "123 A Street, Washington, D.C. 20006" as the user's source location. Alternatively, result box 1115 may display general location information related to the user's source location (not shown).

GUI 1100 also includes result label 1120 "Your Desired Good or Service Provider Is:" to identify result box 1125 that displays the point of interest that is responsive to the user's request in that it is proximate to the user's source location and satisfies the user's beneficial objective. For example, result box 1125 displays "Movie Theater" as the point of interest.

GUI 1100 further includes result label 1130 "Your Beneficial Objective Type Is:" to identify result box 1135 that displays the beneficial objective type selected by the user in GUI 1000A via one of selection controls 1031-1035. For example, if a user chose selection control 1034 in GUI 1000A, result box 1135 displays "Near Another Type of Good or Service Provider" as the user's beneficial objective type.

Result label 1140 "Your Beneficial Objective Good or Service Provider Type Is:" identifies result box 1145 that displays the type of good or service provider selected by the user to be a beneficial objective. For example, if after choosing selection control 1034 in GUI 1000A, a user typed "Chinese restaurant" into text entry box 1084 or selected "Chinese restaurant" from a category presented after choosing hyperlink 1088 in GUI 1000C, result box 1145 displays "Chinese Restaurant" as the user's beneficial objective type of good or service provider.

Result label 1150 "The Location Related to Your Beneficial Objective Is:" identifies result box 1155 that displays the beneficial objective location. For example, if a user chose selection control 1034 in GUI 1000A and entered or selected "Chinese restaurant" as the beneficial objective good or service provider type in GUI 1000C, a location of a Chinese restaurant that is near both the source location and a location related to a desired good or service provider (now the location of the point of interest) may be displayed by result box 1155. In this case, the particular Chinese restaurant that fits the bill is "Good Food Chinese Restaurant" and the beneficial objective location, that is the location of Good Food Chinese Restaurant, is "145 A Street, Washington, D.C. 20006" both of which are displayed in result box 1155. In another example, if a user chose selection control 1031 in GUI 1000A, the location related to the beneficial objective typed into text entry boxes 1061-1064 in GUI 1000B may be displayed in result box 1155 along with the name of the beneficial objective.

Result label 1150 and result box 1155 are accompanied by hyperlink 1170 directing a user to "Click HERE to See Map & Get Directions." A user may select hyperlink 1170 to view a map, such as, for example, a street map, of the beneficial objective location, or to get directions, such as, for example driving directions or directions for taking public transportation, from either the source location or another user-specified location to the beneficial objective location. For example, by clicking hyperlink 1170, a user may view a street map that indicates that Good Food Chinese Restaurant is located at 145 A Street, Washington, D.C. 20006.

If the beneficial objective type selected by a user in GUI 1000A did not require any additional information, for example, if a user chose any one of selection controls 1032, 1033, or 1035, result labels 1140 and 1150, associated result boxes 1145 and 1155, and hyperlink 1170, may not be displayed at all in GUI 1100 or may display different information.

GUI 1100 also includes result label 1160 "Your Point of Interest Is:" that identifies result box 1165 that may display the name and location of the point of interest provided in response to the user's request. For example, the point of interest provided for a user seeking a movie theater near a Chinese restaurant is "ABC Movie Theater" located at "182 A Street, Washington, D.C. 20006." Similar to hyperlink 1170, hyperlink 1180 is located to the right of result box 1165 directing a user to "Click HERE to See Map & Get Directions." A user may select hyperlink 1180 to view a map of the point of interest location or to get directions from either the source location or another user-specified location to the point of interest location. For example, by clicking hyperlink 1180, a user may view a street map that indicates that ABC Movie Theater is located at 182 A Street, Washington, D.C. 20006.

Figure 12:
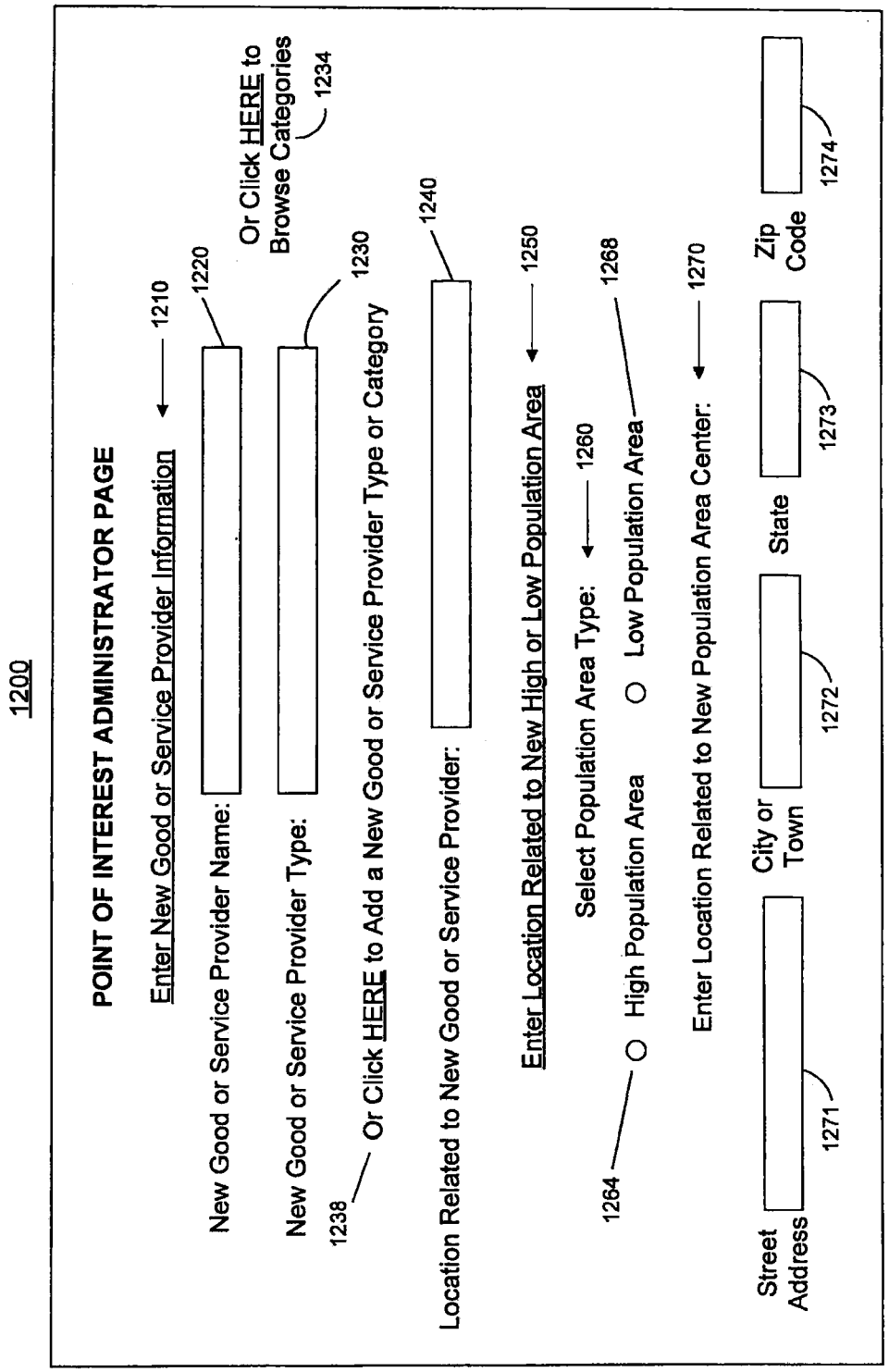
FIG. 12 illustrates an exemplary GUI enabling an administrator to add a new good or service provider and/or a new beneficial objective location of a high or low population area to a data store.

FIG. 12 illustrates an exemplary GUI 1200 enabling an administrator to add a new good or service provider and/or a new beneficial objective location of a high or low population area to a data store. GUI 1200 may include two sections where an administrator may add new information to a data store related to a point of interest search. The two sections are delineated by administrator instruction 1210 and administrator instruction 1250. In association with administrator instruction 1210, GUI 1200 may include text entry boxes 1220, 1230, and 1240, and hyperlinks 1234 and 1238 associated with text entry box 1230. Associated with administrator instruction 1250, GUI 1200 may include sub-administrator instructions 1260 and 1270, as well as selection controls 1264 and 1268 associated with sub-administrator instruction 1260 and text entry boxes 1271-1274 associated with sub-administrator instruction 1270.

Administrator instruction 1210 instructs an administrator to "Enter New Good or Service Provider Information." An administrator may enter the name of a new good or service provider in text entry box 1220. The administrator also may specify a type for the new good or service provider by typing into text entry box 1230. In another implementation, an administrator may enter more than one type for a new good or service provider. Alternatively, the administrator may select hyperlink 1234 directing the administrator to "Click HERE to Browse Categories" to select a type for the new good or service provider by selecting a type from a list of categories provided when hyperlink 1234 is selected (not shown).

If the administrator selects hyperlink 1234 and finds that no existing category or type is suitable to label the new good or service provider, the administrator may select hyperlink 1238 directing the administrator to "Click HERE to Add a New Good or Service Provider Type or Category." Another GUI may be provided (not shown) to enable the administrator to enter a new good or service provider type or category by providing the type of category to a text entry box. In another implementation, simply typing an unknown, or new, good or service provider type into text entry box 1230 may add that type to the list of available good or service provider types. In some implementations, when a new good or service provider type is typed into text entry box 1230 or entered after hyperlink 1238 is selected, another GUI (not shown) may appear to enable an administrator to associate the new good or service provider type with one or more existing or new categories.

After entering a name and type for a new good or service provider, an administrator may enter a location related to the new good or service provider by typing into text entry box 1240. In some implementations, an administrator may enter detailed location information, such as an address, for the new good or service provider. In some implementations, an administrator may enter general location information for the new good or service provider, such as cross-streets, a neighborhood, a town, a city, a state, or a zip code. In some implementations, an administrator may enter both detailed and general location information related to a new good or service provider. Text entry box 1240 may represent any one of the location information types of the implementations discussed above. In some implementations, location information, either detailed or general, may automatically populate text entry box 1240 upon entry of a new good or service provider name. The location information may be retrieved by host 430 from a database, such as, for example, an electronic yellow pages.

For example, an administrator may wish to enter new good or service provider information relating to a new bookstore that opened in Washington, D.C. Under administrator instruction 1210, the administrator may enter "Reading Is Fun Bookstore" in text entry box 1220, "bookstore," "store," or both in text entry box 1230 and detailed location information "210 A Street, Washington, D.C. 20006," general location information "zip code 20006," or both in text entry box 1240.

Administrator instruction 1250 instructs an administrator to "Enter Location Related to New High or Low Population Area." Sub-administrator instruction further instructs an administrator to "Select Population Area Type." An administrator may choose selection control 1264 to indicate the new information relates to a high population area, or selection control 1268 to indicate the new information relates to a low population area.

In response to sub-administrator instruction 1270 "Enter Location Related to New Population Area Center," an administrator may enter an address as the center of the population area by typing a street address into text entry box 1271, a city or town into text entry box 1272, a state into text entry box 1273, and a zip code into text entry box 1274. In another implementation (not shown), an administrator may enter general location information, for example, cross-streets, a neighborhood, a city, a town, a state, or a zip code, as the location related to a new population area center. In yet another implementation (not shown), an administrator may enter both detailed and general location information related to a new population area center.

For example, an administrator may wish to enter information related to a new low population area. The administrator may choose selection control 1268 to indicate the new population area is a low population area and may then enter "111 Z Street, Washington, D.C. 20006" as the location related to a new population area center.

Although this document is focused on a directory search application, the techniques described herein are more generally applicable. For example, the techniques may be applied in a network routing context. In a network routing application, an amount of inbound and outbound traffic, such as, for example, data packets, may be equalized on a particular network, or among multiple networks in order to, for example, satisfy a peering agreement (i.e., an agreement regarding voluntary interconnection of distinctly separate data networks for the purpose of exchanging traffic between the customers of the peered networks). The main search criteria in such an implementation may be speed of transmission of the traffic and cost for sending the traffic over the network.

In another example, the techniques described in this document may be applied to a dating service. In a dating service context, the goal may be to provide a user who has a profile on the dating service with the names and/or contact information for other users whose profiles are similar to the user's own. The search criteria may include any two of, for example, gender, age, location, alma matter, opinion on pets, marital status, interests, religion and political affiliation. In addition to an online dating service, this implementation may be expanded to include any social networking application where a particular user is seeking other users who have attributes in common with the particular user.

In yet another example, the techniques described may be used in the context of product development. As such, the goal may be to produce an ideal product based on design and manufacturing constraints in light of product attributes preferred by consumers.

Furthermore, although this document is focused on two-dimensional geometrical representations (e.g., Delauney Triangles having vertices that represent source locations, beneficial objective locations and locations of desired good or service providers), geometrical representations having other dimensions also may be used. For example, three-dimensional geometrical representations, such as, for example, pyramids, may be used to represent various locations related to a user's search for a desired good or service provider. Increasing the number of dimensions allows the geometrical representation to include more locations. In the example of a pyramid, which would include five "vertices," five objects can be related to the pyramid. For example, a user may wish to make several stops during a particular journey, and thus, the additional objects related to the three-dimensional geometrical representations may relate to additional desired good or service providers (e.g., the dentist's office and the library) and/or beneficial objectives (e.g., a dry-cleaner and a grocery store).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method of providing a location of a first type of good or service provider based on proximity to a location of a second type of good or service provider, the method comprising:
   receiving, from a user, a request for a location of a first type of good or service provider;
   identifying, by at least one processor, a first location that matches the first type of good or service provider and a second location that matches the first type of good or service provider, the second location being different than the first location;
   identifying, by at least one processor, a source location of the user;
   receiving, from the user, user input that indicates that the user prefers the location of the first type of good or service provider to be geographically proximate to a location of a second type of good or service provider, the second type of good or service provider being different than the first type of good or service provider;

identifying, by at least one processor, a first secondary location that matches the second type of good or service provider and a second secondary location that matches the second type of good or service provider, the second secondary location being different than the first secondary location;

associating, by at least one processor, the first secondary location with the first location based on when an aggregated distance between the source location, the first location, and the first secondary location less than an aggregated distance between the source location, the first location, and the second secondary location;

associating, by at least one processor, the second secondary location with the second location when an aggregated distance between the source location, the second location, and the second secondary location is less than an aggregated distance between the source location, the second location, and the first secondary location;

computing, by at least one processor, a first aggregated distance between the source location, the first location, and the first secondary location;

computing, by at least one processor, a second aggregated distance between the source location, the second location, and the second secondary location; and determining, by at least one processor, whether the first aggregated distance is less than the second aggregated distance.

2. The method of claim 1 further comprising:
in response to determining that the second aggregated distance is less than the first aggregated distance ranking the second location higher than the first location.

3. The method of claim 1 further comprising:
in response to determining that the second aggregated distance is less than the first aggregated distance, causing the second location to be displayed on a display device in a manner that distinguishes the second location from the first location.

4. The method of claim 1 further comprising:
in response to determining that the second aggregated distance is less than the first aggregated distance, ranking the first location higher than the second location despite the second location being located closer to the source location than the first location.

5. The method of claim 1, wherein associating the first secondary location with the first location comprises determining that the first secondary location, the first location, and the source location are vertices of a Delauney Triangle.

6. The method of claim 5, wherein computing the first aggregated distance comprises computing a metric based on a perimeter of the Delauney Triangle.

7. The method of claim 1, wherein associating the second secondary location with the second location comprises determining that the second secondary location, the second location, and the source location are vertices of a Delauney Triangle.

8. The method of claim 7, wherein computing the second aggregated distance comprises computing a metric based on a perimeter of the Delauney Triangle.

9. The method of claim 1 further comprising:
in response to determining that the second aggregated distance is less than the first aggregated distance:
ranking the second location higher than the first location; and
causing the second location to be displayed, on a display device, in a manner that distinguishes the second location from the first location.

10. The method of claim 1 further comprising causing the first location to be displayed, on a display device, without causing the second location to be displayed on the display device.

11. The method of claim 1 further comprising causing the second location to be displayed, on a display device, without causing the first location to be displayed on the display device.

12. A computer readable storage device storing a computer program, which when executed on a processor causes the processor to perform a method of providing a location of a first type of good or service provider based on proximity to a location of a second type of good or service provider, the method comprising:

receiving, from a user, a request for a location of a first type of good or service provider;

identifying a first location that matches the first type of good or service provider and a second location that matches the first type of good or service provider, the second location being different than the first location;

identifying a source location of the user;

receiving, from the user, user input that indicates that the user prefers the location of the first type of good or service provider to be geographically proximate to a location of a second type of good or service provider, the second type of good or service provider being different than the first type of good or service provider;

identifying a first secondary location that matches the second type of good or service provider and a second secondary location that matches the second type of good or service provider, the second secondary location being different than the first secondary location;

associating the first secondary location with the first location when an aggregated distance between the source location, the first location, and the first secondary location is less than an aggregated distance between the source location, the first location, and the second secondary location;

associating the second secondary location with the second location when an aggregated distance between the source location, the second location, and the second secondary location is less than an aggregated distance between the source location, the second location, and the first secondary location;

computing a first aggregated distance between the source location, the first location, and the first secondary location;

computing a second aggregated distance between the source location, the second location, and the second secondary location; and determining whether the first aggregated distance is less than the second aggregated distance.

13. The computer readable storage device of claim 12, wherein the method further comprises:
in response to determining that the second aggregated distance is less than the first aggregated distance ranking the second location higher than the first location.

14. The computer readable storage device of claim 12, wherein the method further comprises:
in response to determining that the second aggregated distance is less than the first aggregated distance causing the second location to be displayed, on a display device in a manner that distinguishes the second location from the first location.

15. The computer readable storage device of claim 12, wherein the method further comprises:

in response to determining that the second aggregated distance is less than the first aggregated distance ranking the first location higher than the second location despite the second location being located closer to the source location than the first location.

16. The computer readable storage device of claim 12, wherein associating the first secondary location with the first location comprises determining that the first secondary location, the first location, and the source location are vertices of a Delauney Triangle, and computing the first aggregated distance comprises computing a metric based on a perimeter of the Delauney Triangle.

17. The computer readable storage device of claim 12, wherein associating the second secondary location with the second location comprises determining that the second secondary location, the second location, and the source location are vertices of a Delauney Triangle, and computing the second aggregated distance comprises computing a metric based on a perimeter of the Delauney Triangle.

18. The computer readable storage device of claim 12, wherein the method further comprises causing the first location to be displayed, on a display device, without causing the second location to be displayed on the display device.

19. The computer readable storage device of claim 12, wherein the method further comprises causing the second location to be displayed, on a display device, without causing the first location to be displayed on the display device.

20. A system for providing a location of a first type of good or service provider based on proximity to a location of a second type of good or service provider comprising:
 a processor; and
 a computer readable storage device storing instructions, which when executed on a processor, causes the processor to:
  receive, from a user, a request for a location of a first type of good or service provider;
  identify a first location that matches the first type of good or service provider and a second location that matches the first type of good or service provider, the second location being different than the first location;
  identify a source location of the user;
  receive, from the user, user input that indicates that the user prefers the location of the first type of good or service provider to be geographically proximate to a location of a second type of good or service provider, the second type of good or service provider being different than the first type of good or service provider;
  identify a first secondary location that matches the second type of good or service provider and a second secondary location that matches the second type of good or service provider, the second secondary location being different than the first secondary location;
  associate the first secondary location with the first location when an aggregated distance between the source location, the first location, and the first secondary location is less than an aggregated distance between the source location, the first location, and the second secondary location;
  associate the second secondary location with the second location when an aggregated distance between the source location, the second location, and the second secondary location is less than an aggregated distance between the source location, the second location, and the first secondary location;
  computing a first aggregated distance between the source location, the first location, and the first secondary location;
  compute a second aggregated distance between the source location, the second location, and the second secondary location; and
  determine whether the first aggregated distance is less than the second aggregated distance.

* * * * *